(12) United States Patent
Sogo et al.

(10) Patent No.: US 10,144,435 B2
(45) Date of Patent: Dec. 4, 2018

(54) IN-VEHICLE APPARATUS

(71) Applicant: DENSO CORPORATION, Kariya, Aichi-pref. (JP)

(72) Inventors: Kenji Sogo, Kariya (JP); Takashi Naoi, Kariya (JP); Makoto Tanaka, Kariya (JP); Kazutoshi Shiomi, Kariya (JP); Ichiro Akahori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/686,684

(22) Filed: Aug. 25, 2017

(65) Prior Publication Data
US 2018/0057011 A1 Mar. 1, 2018

(30) Foreign Application Priority Data

Aug. 26, 2016 (JP) .................. 2016-165945
May 29, 2017 (JP) .................. 2017-105985

(51) Int. Cl.
*B60W 50/00* (2006.01)
(52) U.S. Cl.
CPC .................. *B60W 50/00* (2013.01)
(58) Field of Classification Search
CPC .................. B60W 50/00
See application file for complete search history.

(56) References Cited

U.S. PATENT DOCUMENTS

| 5,841,202 A | 11/1998 | Noguchi et al. | |
| 9,162,639 B2 * | 10/2015 | Kanzaki | H02H 11/003 |
| 2009/0251843 A1 | 10/2009 | Hironaka | |
| 2012/0306217 A1 | 12/2012 | Shoji | |
| 2016/0183389 A1 | 6/2016 | Toyoda et al. | |

FOREIGN PATENT DOCUMENTS

| JP | S57-107300 U | 7/1982 |
| JP | S58-150893 U | 10/1983 |
| JP | S63-220720 A | 9/1988 |
| JP | H07-184301 A | 7/1995 |
| JP | 2002-051403 A | 2/2002 |
| JP | 2006-027315 A | 2/2006 |
| JP | 2006-217727 A | 8/2006 |
| JP | 2009-006773 A | 1/2009 |
| JP | 2009-171841 A | 7/2009 |

(Continued)

*Primary Examiner* — Hieu T Vo
(74) *Attorney, Agent, or Firm* — Oliff PLC

(57) ABSTRACT

An in-vehicle apparatus is provided which is installed in a vehicle including a power supply. The apparatus includes at least one drive circuit that is driven by DC voltage supplied from the power supply, and a positive electrode side line that electrically connects a positive electrode terminal of the power supply and a high-electric potential side electrical path of the drive circuit. A negative electrode terminal of the power supply and a low-electric potential side electrical path of the drive circuit are electrically connected to a body ground of the vehicle. The apparatus includes an auxiliary line that has a first end electrically connected to the positive electrode terminal or the negative electrode terminal and a second end connected to the high-electric potential side electrical path or the body ground, and that is arranged along the positive electrode side line or the body ground.

17 Claims, 23 Drawing Sheets

(56) References Cited

FOREIGN PATENT DOCUMENTS

| | | |
|---|---|---|
| JP | 2013-124066 A | 6/2013 |
| JP | 2014-099553 A | 5/2014 |
| JP | 2014-117047 A | 6/2014 |
| JP | 2014-195373 A | 10/2014 |
| JP | 2014-229829 A | 12/2014 |
| JP | 2015-020544 A | 2/2015 |
| JP | 2015-120462 A | 7/2015 |
| JP | 2016-007093 A | 1/2016 |
| JP | 2016-039697 A | 3/2016 |
| JP | 2016-039698 A | 3/2016 |

* cited by examiner

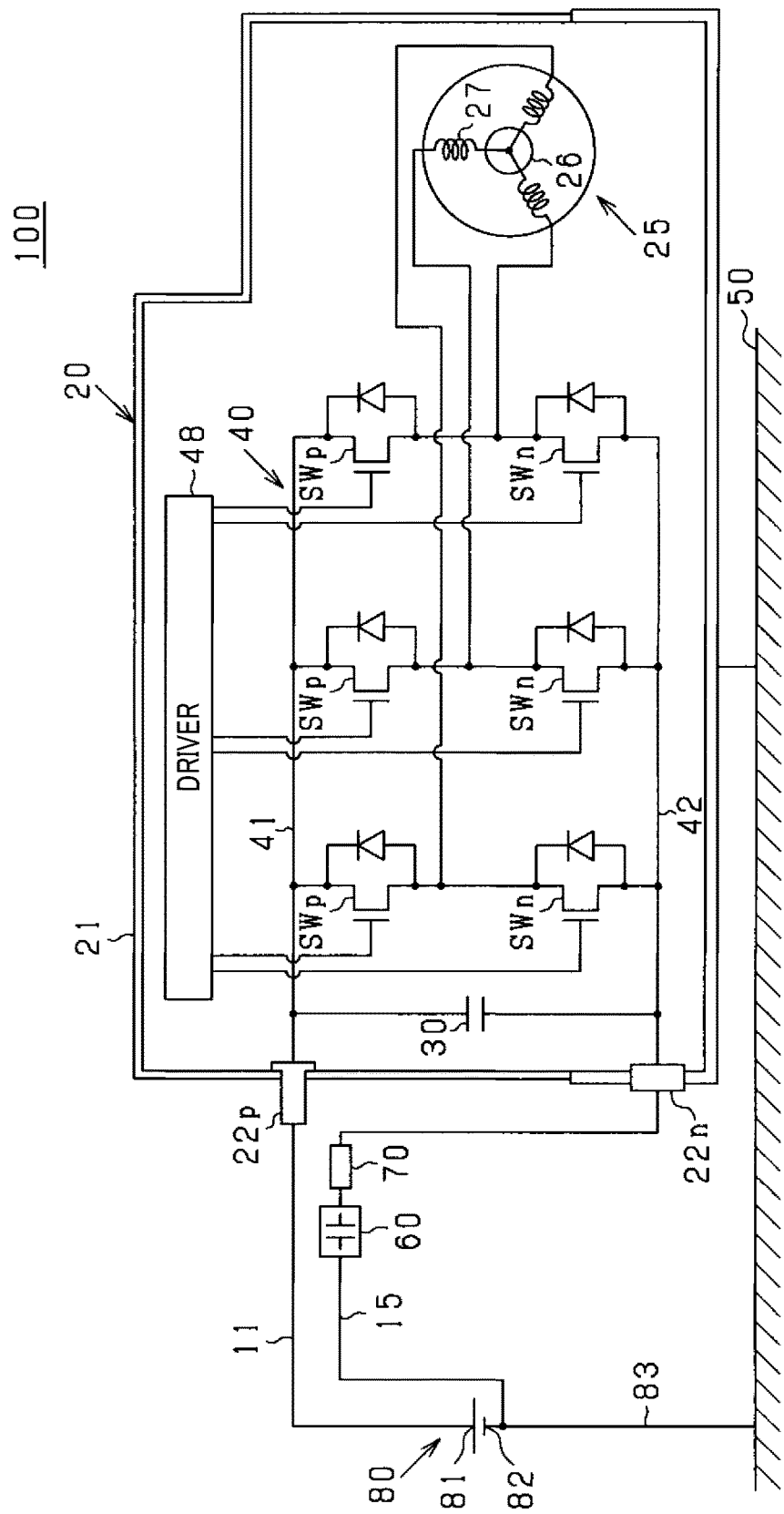

IN-VEHICLE APPARATUS

CROSS-REFERENCE TO RELATED APPLICATION

This application is based on and claims the benefit of priority from earlier Japanese Patent Applications No. 2016-165945 filed Aug. 26, 2016 and No. 2017-105985 filed May 29, 2017, the descriptions of which are incorporated herein by reference.

BACKGROUND

Technical Field

The present invention relates to an in-vehicle apparatus that is installed in a vehicle and whose low-electric potential side is electrically connected to the body ground.

Related Art

Conventionally, as disclosed in JP-A-63-220720, an in-vehicle apparatus is known which includes an AC generator and in which a capacitor is connected in parallel with an output line connecting the AC generator and a positive electrode side terminal of a battery.

In the apparatus disclosed in JP-A-63-220720, the AC generator and the battery are connected to the body ground. When the AC generator is driven, high-frequency current flows to a loop including the AC generator, the output line, and the body ground. Then, the output line and the body ground function as an antenna to radiate noise. In this case, the radiated noise may affect other circuits.

As a measure against such noise, it can be considered that a noise filter is used in a circuit. However, since electronic devices installed in a vehicle are driven by a large current, it is required to use a noise filter having a rated current resisting the large current. Typically, as the rated current becomes large, the size of a noise filter becomes large. Hence, according to the measure using a noise filter, the size of the apparatus necessarily becomes large, which is not practical.

SUMMARY

An embodiment provides an in-vehicle apparatus that can suppress noise radiation.

As an aspect of the embodiment, an in-vehicle apparatus is provided which is installed in a vehicle including a power supply. The apparatus includes at least one drive circuit that is driven by DC voltage supplied from the power supply, and a positive electrode side line that electrically connects a positive electrode terminal of the power supply and a high-electric potential side electrical path of the drive circuit. A negative electrode terminal of the power supply and a low-electric potential side electrical path of the drive circuit are electrically connected to a body ground of the vehicle. The apparatus includes an auxiliary line that has a first end electrically connected to the positive electrode terminal or the negative electrode terminal and a second end connected to the high-electric potential side electrical path or the body ground, and that is arranged along the positive electrode side line or the body ground.

BRIEF DESCRIPTION OF THE DRAWINGS

In the accompanying drawings:

FIG. 1 is a diagram illustrating the configuration of an in-vehicle apparatus according to a first embodiment;

DETAILED DESCRIPTION OF THE PREFERRED EMBODIMENTS

Figure 2A:
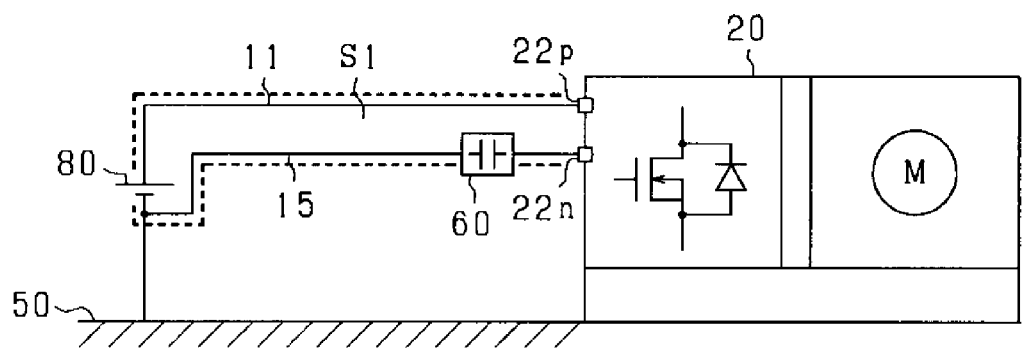
FIGS. 2A and 2B are diagrams illustrating a magnetic field generated in lines according to the first embodiment.

Hereinafter, embodiments of an in-vehicle apparatus will be described with reference to the drawings. It is noted that, in the following embodiments, parts similar to or equivalent to each other are denoted by the same reference numerals to omit redundant descriptions.

First Embodiment

FIG. 1 is a diagram illustrating the configuration of an in-vehicle apparatus. The in-vehicle apparatus illustrated in the first embodiment is part of a power control system 100 that controls power for starting an engine installed in a vehicle, and is configured as an ISG (integrated starter generator). The power control system 100 includes an ISG 20 and a battery 80 disposed so as to be apart from the ISG 20. In the present embodiment, the battery 80 functions as a power supply.

The ISG 20 is a unit having a function of a generator and a function of a motor, and includes a case 21, a motor generator 25 serving as a rotary electric machine, a smoothing capacitor 30, and an inverter 40 functioning as a drive circuit.

The case 21 is formed of a metallic frame and houses the motor generator 25, the smoothing capacitor 30, and the inverter 40.

The ISG 20 includes a high-electric potential side terminal 22p and a low-electric potential side terminal 22n functioning as electrodes. The high-electric potential side terminal 22p and the low-electric potential side terminal 22n are arranged so as to be exposed outside the case 21. The high-electric potential side terminal 22p functions as a feeding terminal of DC voltage (e.g. DC 12 V) supplied from the battery 80. It is noted that, in the present embodiment, as the high-electric potential side terminal 22p, a stud bolt terminal is used which is disposed so as to project from the case 21.

The motor generator 25 is an AC motor. In the present embodiment, the motor generator 25 is a three-phase AC motor. The motor generator 25 includes a rotor 26, and three-phase stator windings 27 that generate induced electromotive force with the rotation of the rotor 26. The stator windings 27 are configured, for example, by making a Y-connection of three-phase windings.

The inverter 40 functions as a DC/AC conversion circuit having a function of converting DC power supplied from the battery 80 to AC power and a rectification function of converting AC power generated from the motor generator 25 to DC power. In FIG. 1, the inverter 40 includes a high-electric potential side electrical path 41, a low-electric potential side electrical path 42, series connections of upper and lower arm switches SWp and SWn, and a driver 48.

The high-electric potential side electrical path 41 is connected to the high-electric potential side terminal 22p and is supplied with DC voltage from the battery 80 through the high-electric potential side terminal 22p. In addition, the low-electric potential side electrical path 42 is electrically connected to the case 21 and is connected to the body ground 50 via the case 21. For example, the low-electric potential side electrical path 42 is connected to the case 21 by a low-electric potential side terminal 22n provided to the case 21.

The inverter 40 includes series connections of the upper arm switch SWp and the lower arm switch SWn for three phases. In each of the three phases, the connecting point between the upper arm switch SWp and the lower arm switch SWn is connected to a first end of the stator winding 27. In each of the three phases, a second end of the stator winding 27 is connected to a neutral point. In the present embodiment, as the switches SWp and SWn, voltage-controlled semiconductor switches, specifically, N-channel MOSFETs are used. Each of the switches SWp and SWn is connected with a body diode in inverse parallel. It is noted that the switches SWp and SWn are not limited to MOSFETs but may be, for example, IGBTs. In this case, each of the IGBTs may be connected to a free-wheel diode in inverse parallel. The drain of the upper arm switch SWp is connected with the high-electric potential side electrical path 41, and the source of the lower arm switch SWn is connected with the low-electric potential side electrical path 42. The gate of each of the switches SWp and SWn is connected to an output terminal of the driver 48. The driver 48 outputs a gate signal to the gates to alternately turn on the upper arm switch SWp and the lower arm switch SWn.

When the ISG 20 having the above configuration functions as a generator, the motor generator 25 is rotated to supply electrical power to the battery 80 and loads (not shown). In addition, when the ISG 20 functions as a motor, DC power supplied from the battery 80 is converted to AC power by the inverter 40 to drive the motor generator 25.

The body ground 50 is configured by a metallic body frame of the vehicle and functions as a wiring path at the low-electric potential side of the power control system 100. Specifically, a negative electrode terminal 82 and the body ground 50 of the battery 80 are electrically connected via a ground wire 83. In addition, the case 21 is electrically connected to the body ground 50 via an engine block (not shown). Hence, the low-electric potential side electrical path 42 of the inverter 40 connected to the case 21 is electrically connected to the body ground 50.

The smoothing capacitor 30 connects the high-electric potential side electrical path 41 and the low-electric potential side electrical path 42. The smoothing capacitor 30 smooths ripple components of DC voltage supplied from the battery 80.

In the power control system 100 described above, a loop through which current flows is formed of the battery 80, a positive electrode side line 11, the ISG 20, and the body ground 50. In the loop, a current path including the positive electrode side line 11 and the body ground 50 may function as an antenna to radiate noise generated from the ISG 20 to the outside as an electromagnetic wave. This is not desirable because the radiated noise may adversely affect other devices installed in the vehicle. To suppress the noise, it can be considered that a noise filter may be provided in the case 21 of the ISG 20 to remove noise. However, since an in-vehicle apparatus is typically driven by a large current, elements of a noise filter having a rated current corresponding to the large current become large in size. Hence, when a noise filter is used to reduce noise, the ISG 20 becomes large, which is not practical. To solve this, in the present embodiment, an auxiliary line is added between the battery 80 and the ISG 20 to reduce the radiated noise Next, a configuration used for a measure against noise in a path connecting the battery 80 and the ISG 20 will be described. The in-vehicle apparatus includes the positive electrode side line 11 electrically connecting a positive electrode terminal 81 of the battery 80 and the high-electric potential side terminal 22*p*, and an auxiliary line 15.

The auxiliary line 15 has a first end and a second end. The first end is electrically connected to the negative electrode terminal 82 of the battery 80. The second end is electrically connected to the body ground 50. In FIG. 1, the second end of the auxiliary line 15 is connected to the low-electric potential side terminal 22*n* of the case 21. Hence, the auxiliary line 15 is electrically connected to the body ground 50 via the case 21. In addition, the auxiliary line 15 is arranged so as to be along the positive electrode side line 11 (so as to extend along the positive electrode side line 11). Specifically, the auxiliary line 15 is arranged so that the distance to the positive electrode side line 11 in the height direction of the vehicle is shorter than the distance to the body ground 50 in the height direction.

In addition, the auxiliary line 15 is provided with a capacitor 60. In FIG. 1, the capacitor 60 is connected in series between the ISG 20 side of the auxiliary line 15 and case 21. The capacitor 60 corresponds to a DC component suppressing element that suppresses DC components of current flowing to the auxiliary line 15 to prevent a large current from flowing to the auxiliary line 15.

Furthermore, the auxiliary line 15 is provided with a fuse 70. In FIG. 1, the fuse 70 is provided on the auxiliary line 15 and between the capacitor 60 and the low-electric potential side terminal 22*n*. The fuse 70 causes a blowout when a large current equal to or more than the rated current has flowed to the auxiliary line 15, thereby protecting the power control system 100. It is noted that large current flows to the auxiliary line 15, for example, when the capacitor 60 causes a short-circuit failure.

Figure 2B:
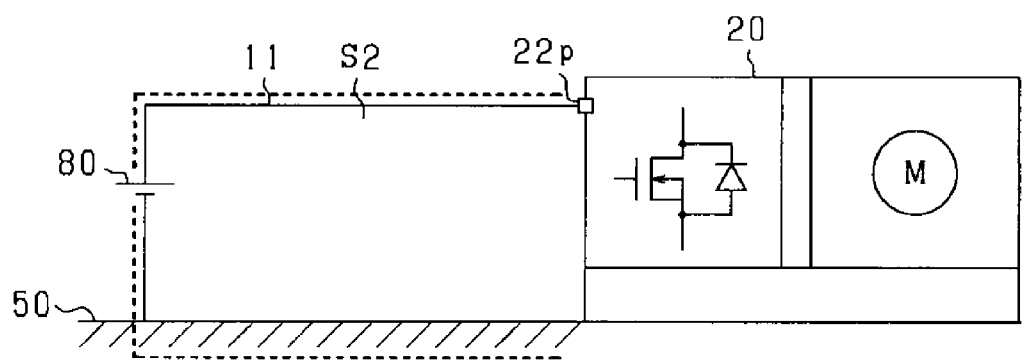
Figure 3A:
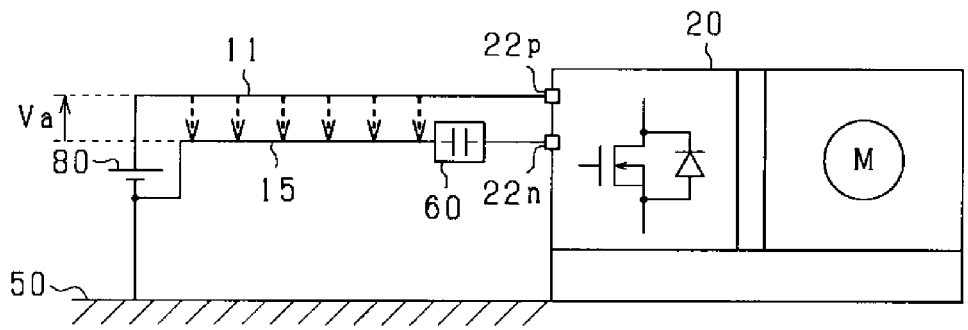
FIGS. 3A and 3B are diagrams illustrating an electric field generated between lines according to the first embodiment.
Figure 3B:
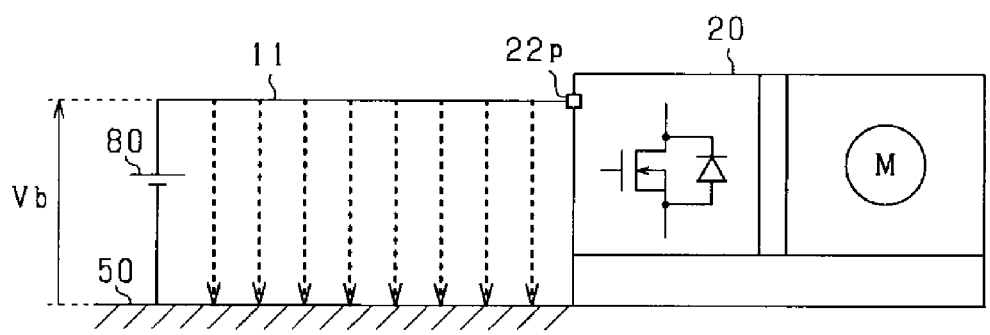

Next, in the above power control system 100, the reduction of noise radiated from a loop including the battery 80, the positive electrode side line 11, the ISG 20, and the body ground 50 is described with reference to FIG. 2A to FIG. 4. FIG. 2A and FIG. 3A show the power control system 100 according to the present embodiment. FIG. 2B and FIG. 3B show the power control system 100, in which the auxiliary line 15 is not connected, in order to be compared with the system according to the present embodiment. It is noted that, in FIG. 2A and FIG. 3A, the ISG 20 and the like are simplistically shown. In addition, in FIG. 2A and FIG. 3A, the fuse 70 is not shown.

As shown in FIG. 2B, when the switches SWp and SWn configuring the inverter 40 are turned on and off, high-frequency current flows to a loop-shaped path including the high-electric potential side electrical path 41, the high-electric potential side terminal 22*p*, the positive electrode side line 11, the battery 80, the body ground 50, and the low-electric potential side electrical path 42. The frequency of the high-frequency current becomes a harmonic frequency of a switching frequency of the switches SWp and SWn. When the high-frequency current flows to the path, the path connecting the positive electrode side line 11 and the body ground 50 acts as an antenna, whereby noise is radiated. It is noted that as the area S2 of the loop increases, the magnetic field generated in the path through which high-frequency current flows becomes stronger, whereby noise is easily radiated. In contrast, as shown in FIG. 2A, the auxiliary line 15 is arranged so as to be along the positive electrode side line 11. Thereby, the area S1 of the loop including the high-electric potential side electrical path 41, the high-electric potential side terminal 22*p*, the positive electrode side line 11, the battery 80, the auxiliary line 15, the low-electric potential side terminal 22*n*, and the low-electric potential side electrical path 42 becomes smaller than the area S2 shown in FIG. 2B.

In addition, since the auxiliary line 15 is arranged so as to be along the positive electrode side line 11, the distance between the positive electrode side line 11 and the auxiliary line 15 becomes short, which increases a coupling coefficient of inductances of the lines 11 and 15. As a result, mutual inductance M of the positive electrode side line 11 and the auxiliary line 15 are increased, which can reduce mutual inductance L of each of the lines 11 and 15 acting as an antenna shown in FIG. 2A. Reducing the inductance L can prevent lines of magnetic force to be prevented from being generated from the lines 11 and 15.

It is noted that combined inductance L of the lines 11 and 15 can be calculated by using the following expression (1):

$$L = L1 + L2 - 2M \qquad (1)$$

where L1 and L2 are self inductance of the respective positive electrode side line 11 and the auxiliary line 15, and M is mutual inductance between the lines.

In addition, as shown in FIG. 3B, since the potential difference Vb between the positive electrode side line 11 and the body ground 50 is large, an electric field generated between the positive electrode side line 11 and the body ground 50 becomes large, whereby noise is easily radiated. In contrast, as shown in FIG. 3A, arranging the auxiliary line 15 so as to be along the positive electrode side line 11 makes the positive electrode side line 11 and the auxiliary line 15 capacitively-coupled, whereby the potential difference Va between the positive electrode side line 11 and the auxiliary line 15 can be small compared with the potential difference Vb shown in FIG. 3B. As a result, the electric field generated between the lines can be smaller, whereby noise radiation can be suppressed.

The lines having a predetermined potential difference has an effect of reducing the potential difference as a potential of the line arranged along the auxiliary line is larger. Thus, arranging the auxiliary line 15 along the positive electrode side line 11, which is a high-electric potential side, between the positive electrode side line 11 and the body ground 50 can make small the electric field generated between the lines, whereby noise radiation can be effectively suppressed.

Furthermore, due to the capacitor 60 provided to the auxiliary line 15, only high-frequency current flows to the auxiliary line 15, which suppresses DC components. Hence, the rated current of the auxiliary line 15 can be low, and the linewidth can be small. It is noted that although the DC components flow to the body ground 50 side as return current, since the DC components do not easily change a magnetic field compared with AC components, the DC components do not affect noise radiation.

Figure 4:
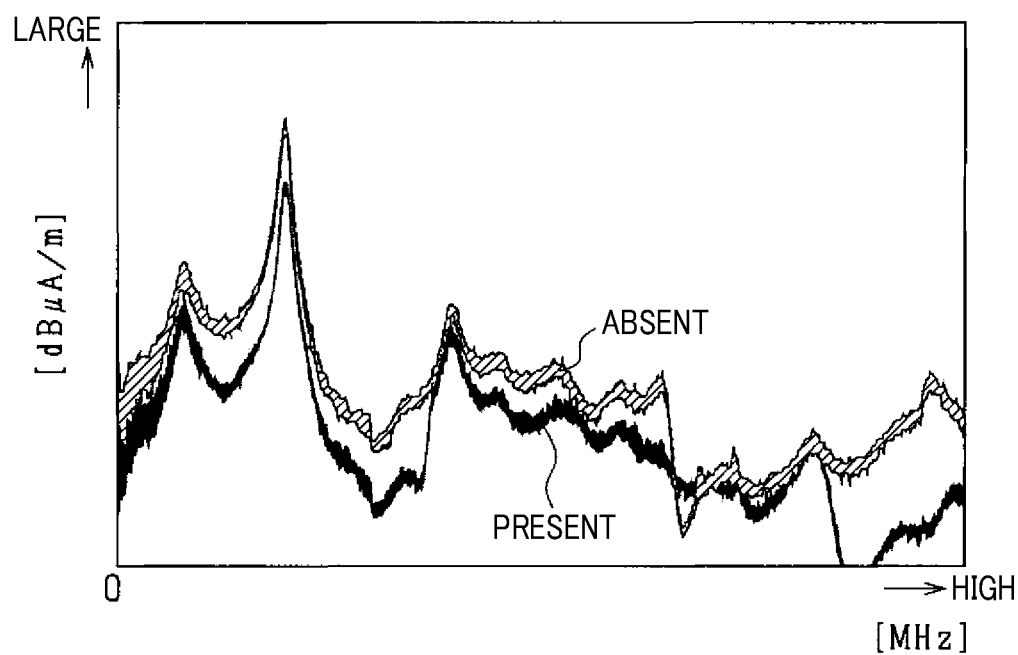
FIG. 4 illustrates magnetic field strength generated between lines according to the first embodiment.

In addition, FIG. 4 is a graph in which the horizontal axis indicates a frequency [MHz] of a magnetic field and the vertical axis indicates field intensity H [dBµA/m]. As shown in FIG. 4, since the auxiliary line 15 is electrically connected between the positive electrode side line 11 and the body ground 50, field intensity H becomes low within almost all the frequency band. Thus, it can be understood that the auxiliary line 15 has an effect of suppressing noise radiation generated from the positive electrode side line 11 and the body ground 50.

As described above, in the first embodiment, the first end of the auxiliary line 15 is electrically connected to the negative electrode terminal 82 of the battery 80, and the second end of the auxiliary line 15 is electrically connected to the body ground 50. In addition, the auxiliary line 15 is arranged so as to be along the positive electrode side line 11.

According to this configuration, the area of the loop through which high-frequency current flows can be smaller than the area of the loop including the positive electrode side line 11 and the body ground 50. Then, the auxiliary line 15 can be arranged so as to be along the positive electrode side line 11, whereby the mutual inductance M between the positive electrode side line 11 and the auxiliary line 15 can be large to make small the inductance between the lines. As a result, the magnetic field generated around the lines can be suppressed, whereby noise radiation can be reduced. In addition, a measure against noise using the auxiliary line 15 can prevent the apparatus from becoming large compared with a case where a noise filter is used.

The auxiliary line 15 is arranged so as to be along the positive electrode side line 11. In the above configuration, arranging the auxiliary line 15 so as to be along the positive electrode side line 11 makes the positive electrode side line 11 and the auxiliary line 15 capacitively-coupled, whereby the potential difference between the lines 11 and 15 can be small compared with a case where an auxiliary line is not present. As a result, an electric field can be prevented from being generated around the lines, whereby noise radiation can be reduced.

The area of the loop including the body ground 50 and the auxiliary line 15 is smaller than the area of the loop including the positive electrode side line 11 and the body ground 50. According to the above configuration, the area of the loop through which high-frequency current flows can be small, whereby the amount of radiation of noise generated from the lines can be suppressed.

A DC component suppressing element is provided that is provided to the auxiliary line 15 and suppresses DC current flowing to the auxiliary line 15. Due to the DC component suppressing element, only high-frequency noise components flow to the auxiliary line 15, and DC components can be prevented from flowing to the auxiliary line 15. As a result, the diameter of the auxiliary line 15 can be small, whereby the apparatus can be prevented from becoming large.

The DC component suppressing element is the capacitor 60. According to the above, DC components can be prevented from flowing to the auxiliary line 15, whereby the diameter of the auxiliary line 15 can be small.

The case 21 is provided which houses the ISG 20. The battery 80 is disposed apart from the case 21. The positive electrode side line 11 is disposed between the battery 80 and the case 21. In addition, the auxiliary line 15 is arranged outside the case 21 so as to be along the positive electrode side line 11 or the body ground 50. In the above configuration, arranging the auxiliary line 15 outside the case 21 so as to be along the positive electrode side line 11 or the body ground 50 can suppress noise radiation while the space between the battery 80 and the ISG 20 are effectively used. As a result, since a configuration for suppressing noise radiation is not required to be provided in the ISG 20, the apparatus can be prevented from becoming large.

The inverter 40 (drive circuit) has a switch and is a power converter in which the switch is subjected to switching operation. According to the configuration, noise radiation due to switching operation can be suppressed.

Second Embodiment

Figure 5:
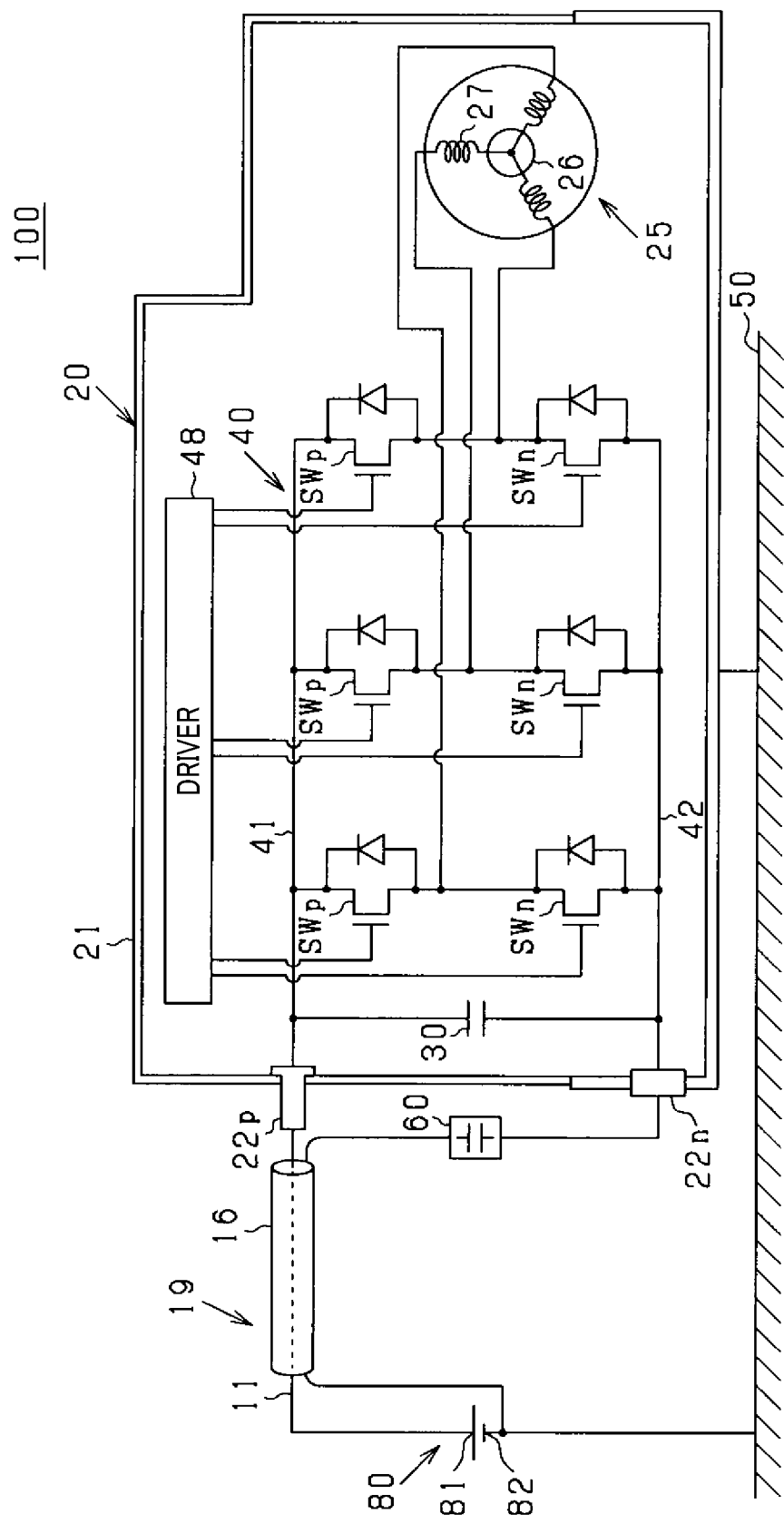
FIG. 5 is a diagram illustrating the configuration of an in-vehicle apparatus according to a second embodiment.

In the second embodiment, the configuration of the auxiliary line is modified. Specifically, as shown in FIG. 5, the auxiliary line 16 is configured so as to cover the positive electrode side line 11. Hence, the auxiliary line 16 is arranged so as to be along the positive electrode side line 11.

Figure 6A:
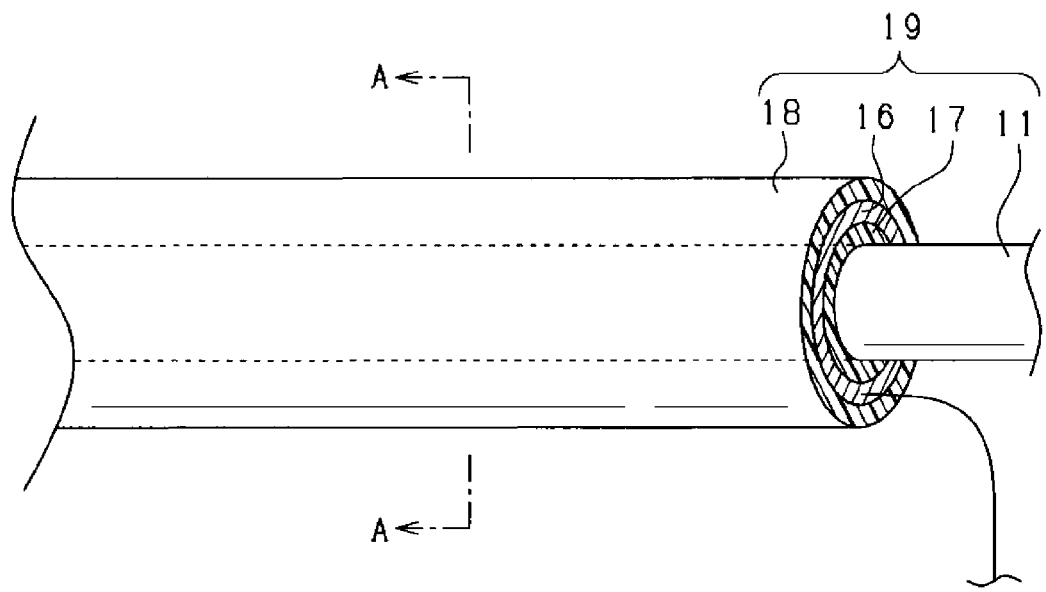
FIGS. 6A and 6B are diagrams illustrating a positive electrode side line and an auxiliary line according to the second embodiment.
Figure 6B:
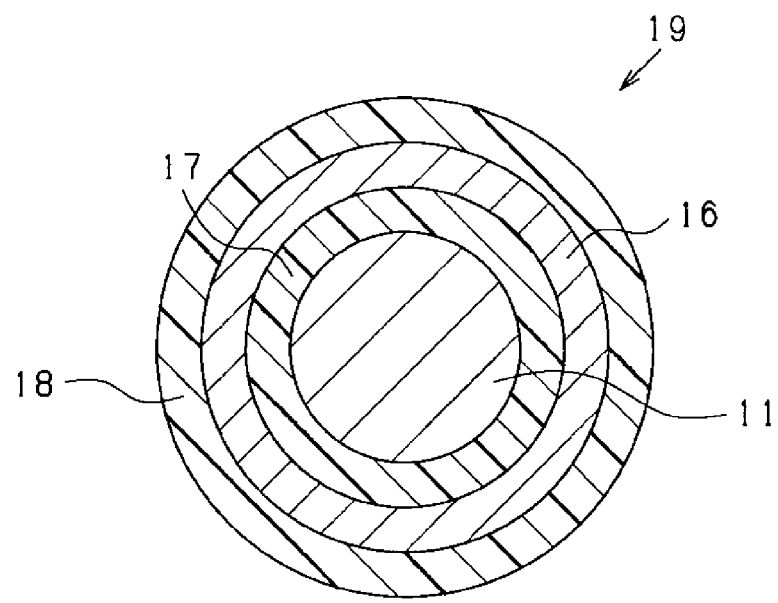

FIGS. 6A and 6B are diagrams illustrating a position relation between the positive electrode side line 11 and the auxiliary line 16. It is noted that FIG. 6B is an A-A section view of FIG. 6A.

As shown in FIGS. 5 and 6, the auxiliary line 16 is integrated with the positive electrode side line 11 as a shielding line (shielding wiring) covering the positive electrode side line 11. Specifically, an inner insulation part 17 formed of a material having electrical insulation characteristics is provided between the positive electrode side line 11 and the auxiliary line 16. The inner insulation part 17 has a circular shape and is formed of, for example, synthetic resin. Covering the positive electrode side line 11 with the auxiliary line 16 can arrange the auxiliary line 16 so as to be along the positive electrode side line 11 while keeping constant the distance between the auxiliary line 16 and the positive electrode side line 11.

An outer sheath part 18 formed of a material having electrical insulation characteristics is provided to the periphery of the auxiliary line 16. The outer sheath 18 has a circular shape covering the auxiliary line 16 and is formed of, for example, synthetic resin. In the present embodiment, the positive electrode side line 11, the inner insulation part 17, the auxiliary line 16, and the auxiliary line part 16 are integrated into a harness member 19.

In addition, as in the case of the first embodiment described above, the auxiliary line 16 has a first end and a second end. The first end is connected to the negative electrode terminal 82 of the battery 80. The second end is connected to the low-electric potential side terminal 22*n* of the case 21. The capacitor 60 is provided at the ISG 20 side of the auxiliary line 16. It is noted that the capacitor 60 may be integrated with the harness member 19 including the auxiliary line 16 or may be provided as a member different from the harness member 19.

As described above, in the second embodiment, the auxiliary line 15 is configured so as to cover the positive electrode side line 11 and to be along the positive electrode side line 11. According to the above configuration, since the auxiliary line 15 is arranged around the positive electrode side line 11, the distance between the lines 11 and 15 becomes short, whereby the mutual inductance can be high. As a result, inductance of lines can be low to suppress noise.

In addition, the auxiliary line 15 is integrated with the positive electrode side line 11 as a shielding line covering the positive electrode side line 11. The positive electrode side line 11 electrically connects the positive electrode terminal 81 of the battery 80 and the high-electric potential side terminal 22*p*. In an engine compartment of the vehicle in which the battery 80 is installed, a number of units are present. Hence, if the positive electrode side line 11 and the auxiliary line 15 are separately provided, properly wiring the lines 11 and 15 becomes difficult. In contrast, according to the above configuration, the positive electrode side line 11 and the auxiliary line 15 are integrated. Hence, only connecting the positive electrode side line 11 and the auxiliary line 15 to respective terminals or the like can make the auxiliary line 15 be along the positive electrode side line 11, thereby improving the workability.

Third Embodiment

Figure 7A:
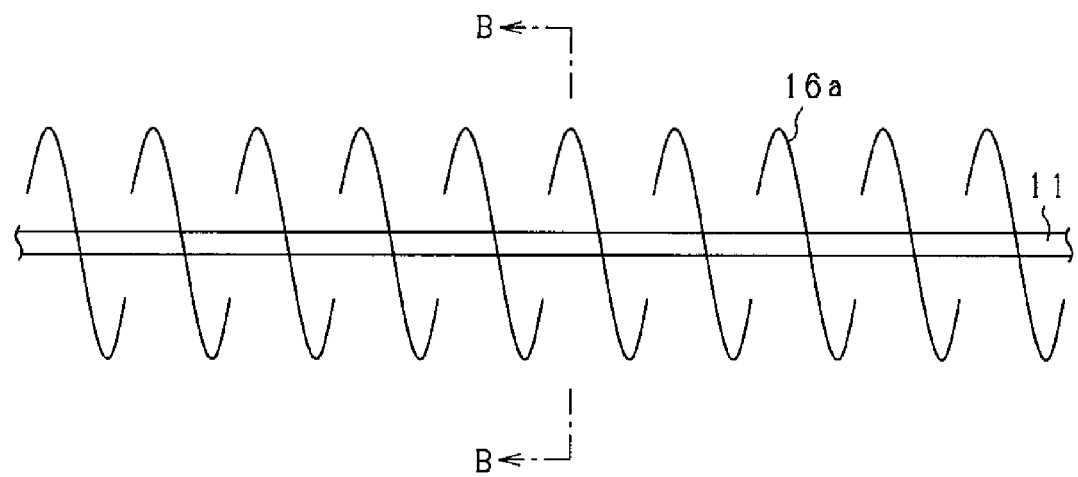
FIGS. 7A and 7B are diagrams illustrating a positive electrode side line and an auxiliary line according to a third embodiment.
Figure 7B:
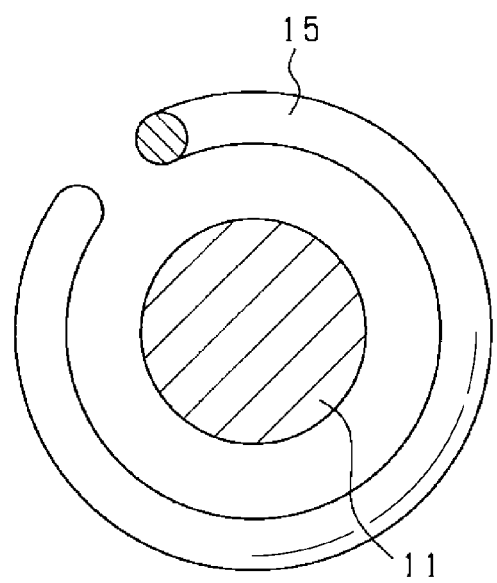

In the third embodiment, the auxiliary line 15 is spirally wound around the positive electrode side line 11 to arrange the auxiliary line 15 so as to be along the positive electrode side line 11. FIGS. 7A and 7B are diagrams illustrating an auxiliary line according to the third embodiment. It is noted that FIG. 7B is a B-B section view of the positive electrode side line 11 and the auxiliary line 15 shown in FIG. 7A.

The auxiliary line 15 shown in FIGS. 7A and 7B are integrated into the positive electrode side line 11 in a state where the auxiliary line 15 are wound multiple times around the positive electrode side line 11. For example, the auxiliary line 15 has a diameter of 0.70 to 0.80 [mm]. An insulation portion (not shown) is provided between the auxiliary line 15 and the positive electrode side line 11. In addition, the auxiliary line 15 is covered with an outer sheath part in a state where the auxiliary line 15 is spirally wound around the positive electrode side line 11, whereby the auxiliary line 15 is integrated with the positive electrode side line 11.

As shown in FIG. 7B, winding the auxiliary line 15 around the positive electrode side line 11 can prevent a distant relationship between the auxiliary line 15 and the positive electrode side line 11 from being significantly changed even when force is applied to the auxiliary line 15. Even when force is applied to the auxiliary line 15 due to the run of the vehicle, the effect of suppressing the magnetic field can be prevented from lowering.

In addition, only integrating the auxiliary line 15 with the positive electrode side line 11 to connect the integrated positive electrode side line 11 and the auxiliary line 15 to the respective terminals or the like can make the auxiliary line 15 be along the positive electrode side line 11, thereby improving the workability.

Fourth Embodiment

Figure 8:
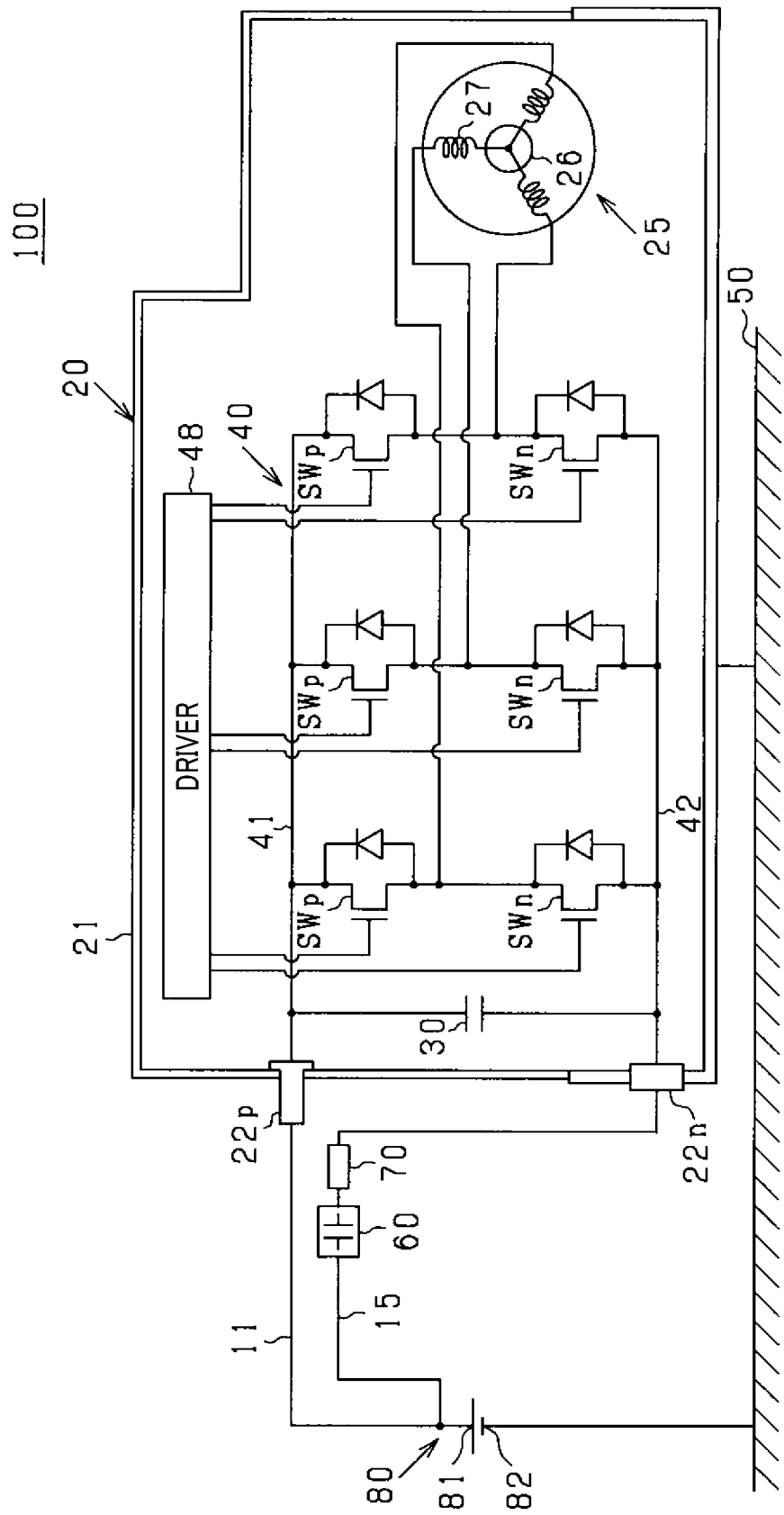
FIG. 8 is a diagram illustrating the configuration of an in-vehicle apparatus according to a fourth embodiment.

In the fourth embodiment, the position of the first end of the auxiliary line 15 connected to the battery 80 is changed. In FIG. 8, the first end of the auxiliary line 15 is connected to the positive electrode terminal 81 of the battery 80, and the second end of the auxiliary line 15 is connected to the body ground 50 via the low-electric potential side terminal 22n of the case 21. Hence, a path connecting the positive electrode side line 11, the ISG 20, the body ground 50, and the auxiliary line 15 configures a loop through which current flows.

The positive electrode terminal 81 and the negative electrode terminal 82 of the battery 80 are arranged at a predetermined distance. Hence, in the fourth embodiment, connecting the first end of the auxiliary line 15 to the positive electrode terminal 81 of the battery 80 to configure a path connecting the positive electrode side line 11 and the auxiliary line 15 can make small the area of the loop through which current flows, thereby suppressing noise radiation.

Fifth Embodiment

Figure 9A:
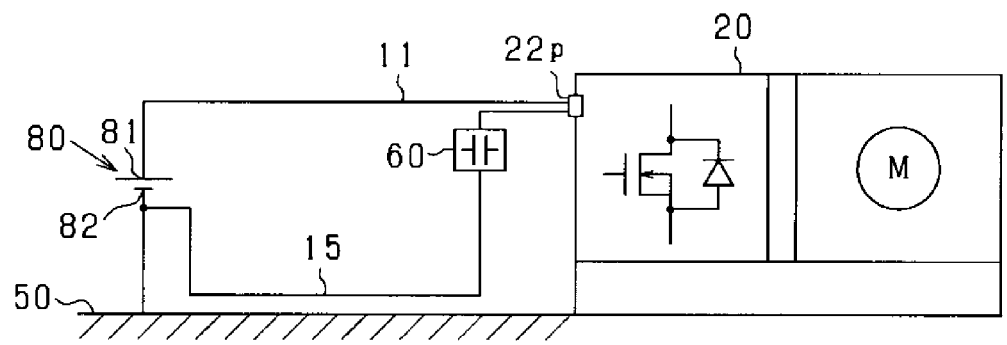
FIGS. 9A and 9B are diagrams illustrating the configuration of an in-vehicle apparatus according to a fifth embodiment.
Figure 9B:
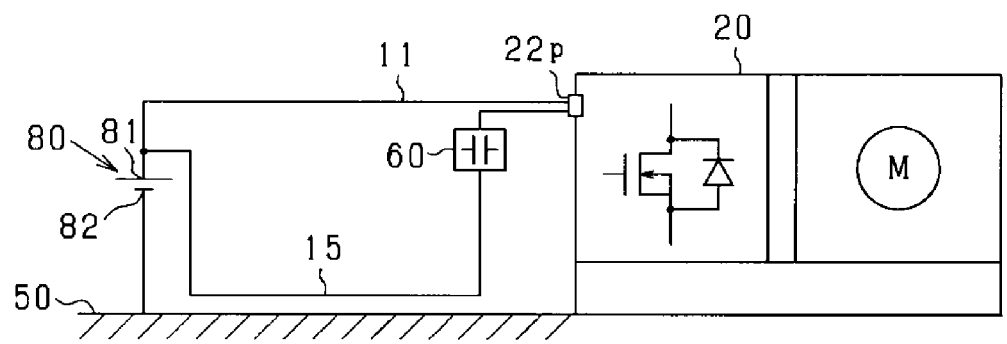

In the fifth embodiment, the arrangement of the auxiliary line 15 is modified. FIGS. 9A and 9B show an in-vehicle apparatus according to the fifth embodiment. Also in FIGS. 9A and 9B, the battery 80 and the ISG 20 are connected via the positive electrode side line 11.

In FIG. 9A, the first end of the auxiliary line 15 is electrically connected to the negative electrode terminal 82 of the battery 80, and the second end of the auxiliary line 15 is electrically connected to the high-electric potential side terminal 22p. Hence, a loop through which current flows is configured by a path including the ISG 20, the auxiliary line 15, and the body ground 50. Hence, the area of the loop path including the body ground 50 and the auxiliary line 15 is smaller than the area of the loop including the positive electrode side line 11 and the body ground 50.

As shown in FIG. 9B, the first end of the auxiliary line 15 is electrically connected to the positive electrode terminal 81 of the battery 80, and the second end of the auxiliary line 15 is electrically connected to the high-electric potential side terminal 22p. In this case, a loop through which current flows is configured by a path including the ISG 20, the auxiliary line 15, the battery 80, and the body ground 50.

Meanwhile, the auxiliary line 15 is arranged so as to be along the body ground 50. Specifically, the auxiliary line 15 is arranged between the positive electrode side line 11 and the body ground 50 so that the distance to the body ground 50 in the height direction of the vehicle is shorter than the distance to the positive electrode side line 11 in the height direction of the vehicle.

As described above, in the fifth embodiment, arranging the auxiliary line 15 so as to be along the body ground 50 can make large the mutual inductance M between the lines, whereby the inductance L can be lowered. As a result, noise radiation can be suppressed.

Sixth Embodiment

Figure 10:
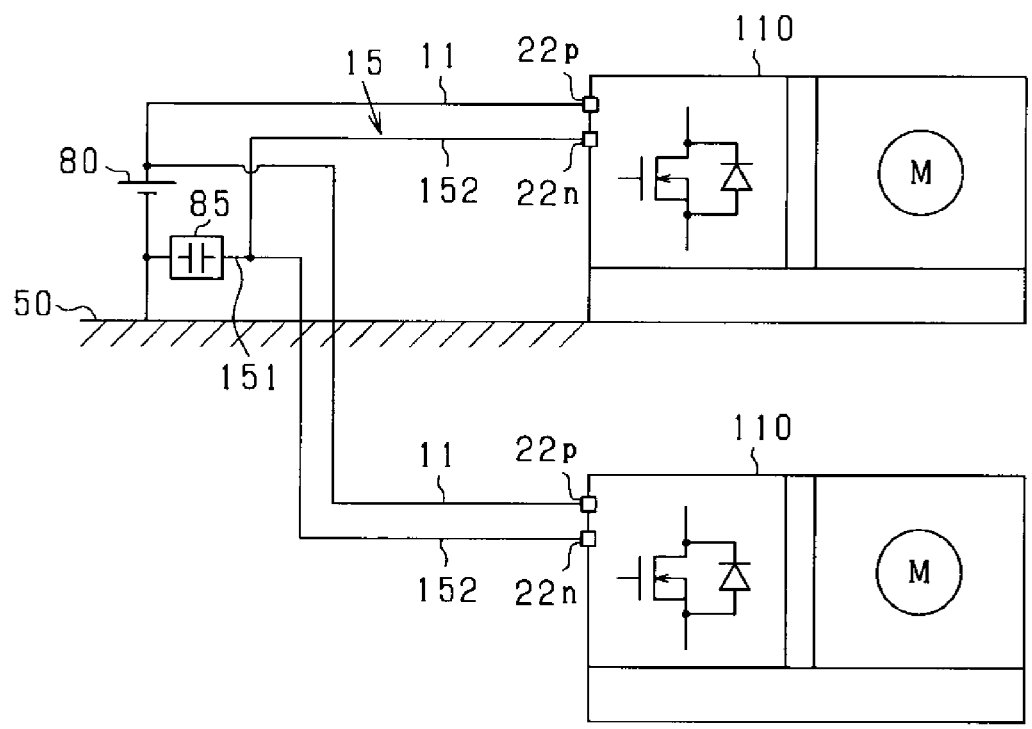
FIG. 10 is a diagram illustrating the configuration of an in-vehicle apparatus according to a sixth embodiment.

In the sixth embodiment, a capacitor 85 functioning as a DC component suppressing element is mounted at the battery 80 side. FIG. 10 is a diagram illustrating the configuration of an in-vehicle apparatus according to the sixth embodiment.

In FIG. 10, the in-vehicle apparatus includes two drive circuits 110. It is noted that, in the present embodiment, reference numerals of the drive circuits are the same for the sake of convenience. The high-electric potential side terminals 22p of the drive circuits 110 are electrically connected to the positive electrode terminal of the battery 80 by the positive electrode side line 11.

The auxiliary line 15 includes a common line 151 electrically connected to the negative electrode terminal of the battery 80 and branch lines 152 that branch off from the common line 151 and are respectively electrically connected to the low-electric potential side terminals 22n of the drive circuits 110. The branch lines 152 are respectively arranged so as to be along the positive electrode side lines 11 connected to the drive circuits 110.

The capacitor 85 is disposed on the auxiliary line 15 so that the distance between the battery 80 and the capacitor 85 is shorter than the distance between the battery 80 and the branch point from which the branch lines 152 branch off from the common line 151.

As described above, in the sixth embodiment, since the capacitor 85 is provided at the battery 80 side, even when loops through which current flows are formed of the positive electrode side lines 11 and the auxiliary line 15 for the plurality of drive circuits 110, the function of the capacitor 85 can be applied to the branch lines 152 configuring the loops. As a result, multiple capacitors 85 are not required for the respective drive circuits 110, whereby the apparatus can be prevented from becoming large.

Seventh Embodiment

Figure 11:
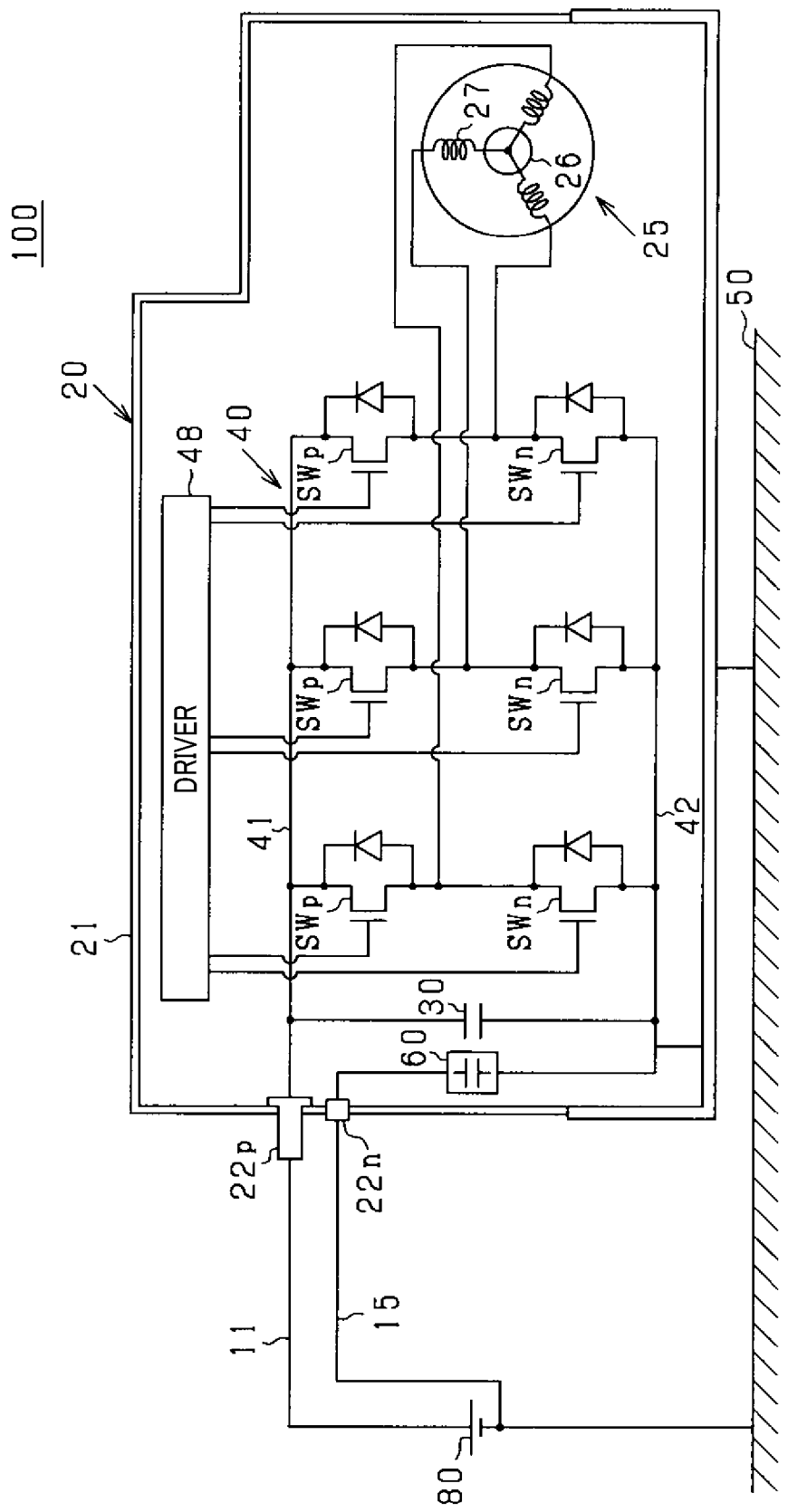
FIG. 11 is a diagram illustrating the configuration of an in-vehicle apparatus according to a seventh embodiment.

The DC component suppressing element may be installed in the case of an in-vehicle apparatus. FIG. 11 is a diagram illustrating the configuration of an in-vehicle apparatus according to the seventh embodiment. Even in the in-vehicle apparatus shown in FIG. 11, the battery 80 and the ISG 20 are connected via the positive electrode side line 11. In addition, the auxiliary line 15 is arranged so as to be along the positive electrode side line 11.

In the case 21 of the in-vehicle apparatus, the capacitor 60 is mounted which functions as the DC component suppressing element. Specifically, the capacitor 60 is connected in series in a path connecting the auxiliary line 15 and the low-electric potential side electrical path 42 of the inverter 40.

Eighth Embodiment

Figure 12:
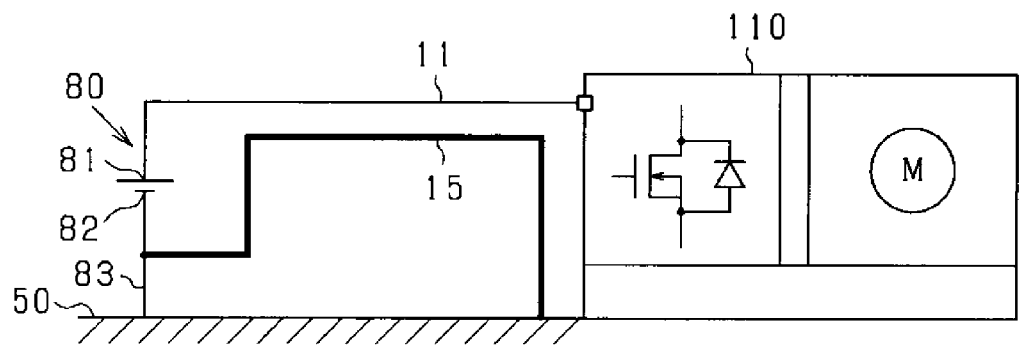
FIG. 12 is a diagram illustrating the configuration of an in-vehicle apparatus according to an eighth embodiment.

In the eighth embodiment, the first end of the auxiliary line 15 is directly connected to the body ground 50. FIG. 12 is a diagram illustrating the configuration of an in-vehicle apparatus according to the eighth embodiment.

In FIG. 12, the first end of the auxiliary line 15 is electrically connected to negative electrode terminal 82 of the battery 80 via a ground wire 83. The second end of the auxiliary line 15 is directly connected to the body ground 50. In addition, negative electrode terminal 82 of the battery 80 is connected to the body ground 50 via the ground wire 83. In the present embodiment, the auxiliary line 15 is arranged so as to be along the positive electrode side line 11.

In FIG. 12, since the auxiliary line 15 is connected with the body ground 50 in parallel, return current flowing from the drive circuit 110 to the battery 80 side branches off into the body ground 50 and the auxiliary line 15. Thereby, since the return current branches off into the auxiliary line 15 and the body ground 50, the rated current of the auxiliary line 15 can be lowered compared with a case where the auxiliary line 15 is used as a dedicated line through which return current flows. Hence, although the diameter of the auxiliary line 15 is large compared with other embodiments, noise radiation can be suppressed without providing the DC component suppressing element such as a capacitor to the auxiliary line 15. In the eighth embodiment, although the auxiliary line 15 and the positive electrode side line 11 are equivalent in size, the diameter of the auxiliary line 15 may be smaller than that of the positive electrode side line 11 depending on the magnitude of branch current flowing to the auxiliary line 15.

Ninth Embodiment

Figure 13:
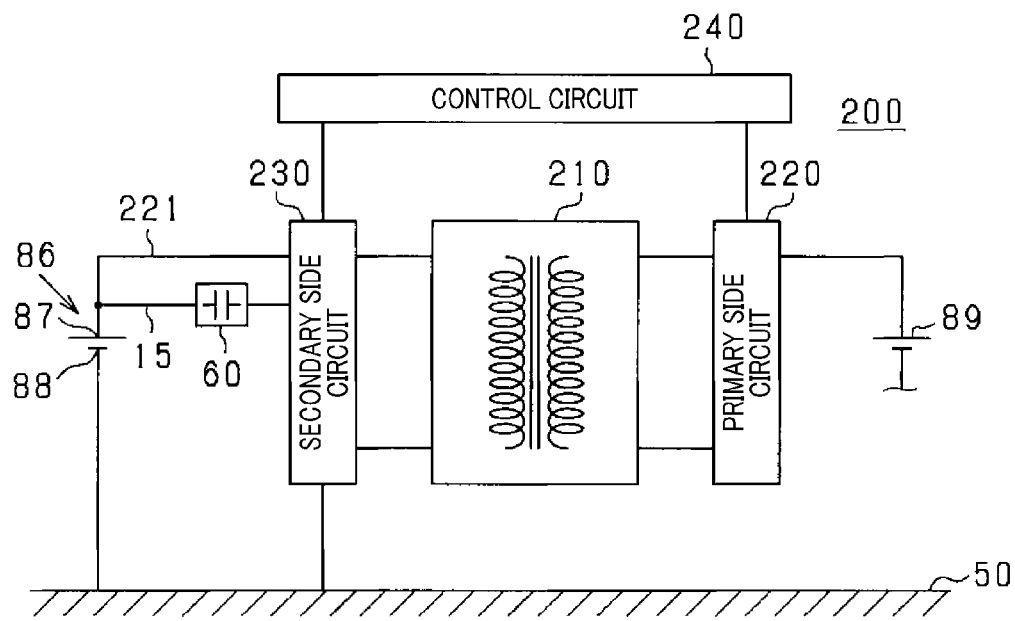
FIG. 13 is a diagram showing a DC/DC converter as an example of the in-vehicle apparatus.

In the present embodiment, as shown in FIG. 13, as a power converter configuring an in-vehicle apparatus, a DC/DC converter 200 is used instead of the inverter 40.

The DC/DC converter 200 shown in FIG. 13 is an insulated DC/DC converter that transforms the input DC voltage and outputs the transformed DC voltage. In the present embodiment, a step-down DC/DC converter is used. The DC/DC converter 200 steps down the DC voltage applied from a high-voltage battery 89 and charges a low-voltage battery 86 whose output voltage is lower than that of the high-voltage battery 89. In addition, a negative electrode terminal 88 of the low-voltage battery 86 is electrically connected to the body ground 50.

The DC/DC converter 200 includes a transformer 210, a primary side circuit 220, a secondary side circuit 230, and a control circuit 240. The primary side circuit 220 is connected with the high-voltage battery 89. A high-electric potential side electrical path of the secondary side circuit 230 is connected with the low-voltage battery 86. A low-electric potential side electrical path of the secondary side circuit 230 is connected with the body ground 50. The control circuit 240 turns on and off switches configuring the primary side circuit 220 so as to convert DC voltage output from the high-voltage battery 89 to AC voltage to apply the AC voltage to a primary coil of the transformer 210. Hence, AC current is output from a secondary coil of the transformer 210 to the secondary side circuit 230. In addition, the control circuit 240 turns on and off switches configuring the secondary side circuit 230 so as to rectify AC current input to the secondary side circuit 230 to DC current to output the DC current to the low-voltage battery 86. Thus, the low-voltage battery 86 is charged.

In the above DC/DC converter 200, a positive electrode side line 221 connects a positive electrode terminal 87 of the low-voltage battery 86 and a high-electric potential side electrical path of the secondary side circuit 230. In addition, the auxiliary line 15 connects the positive electrode terminal 87 of the low-voltage battery 86 and a low-electric potential side electrical path of the secondary side circuit 230. In addition, the auxiliary line 15 is arranged so as to be along the positive electrode side line 221. Furthermore, the auxiliary line 15 is provided with the capacitor 60 functioning as a DC component suppressing element. Hence, noise radiated from paths of the positive electrode side line 221 and the body ground 50 can be suppressed. It is noted that the auxiliary line 15 may connect the negative electrode terminal 88 of the low-voltage battery 86 and the low-electric potential side electrical path of the secondary side circuit 230. Also in this case, the auxiliary line 15 is arranged so as to be along the positive electrode side line 221.

Tenth Embodiment

In this tenth embodiment, the configurations different from those of the second embodiment will be mainly described.

Figure 14:
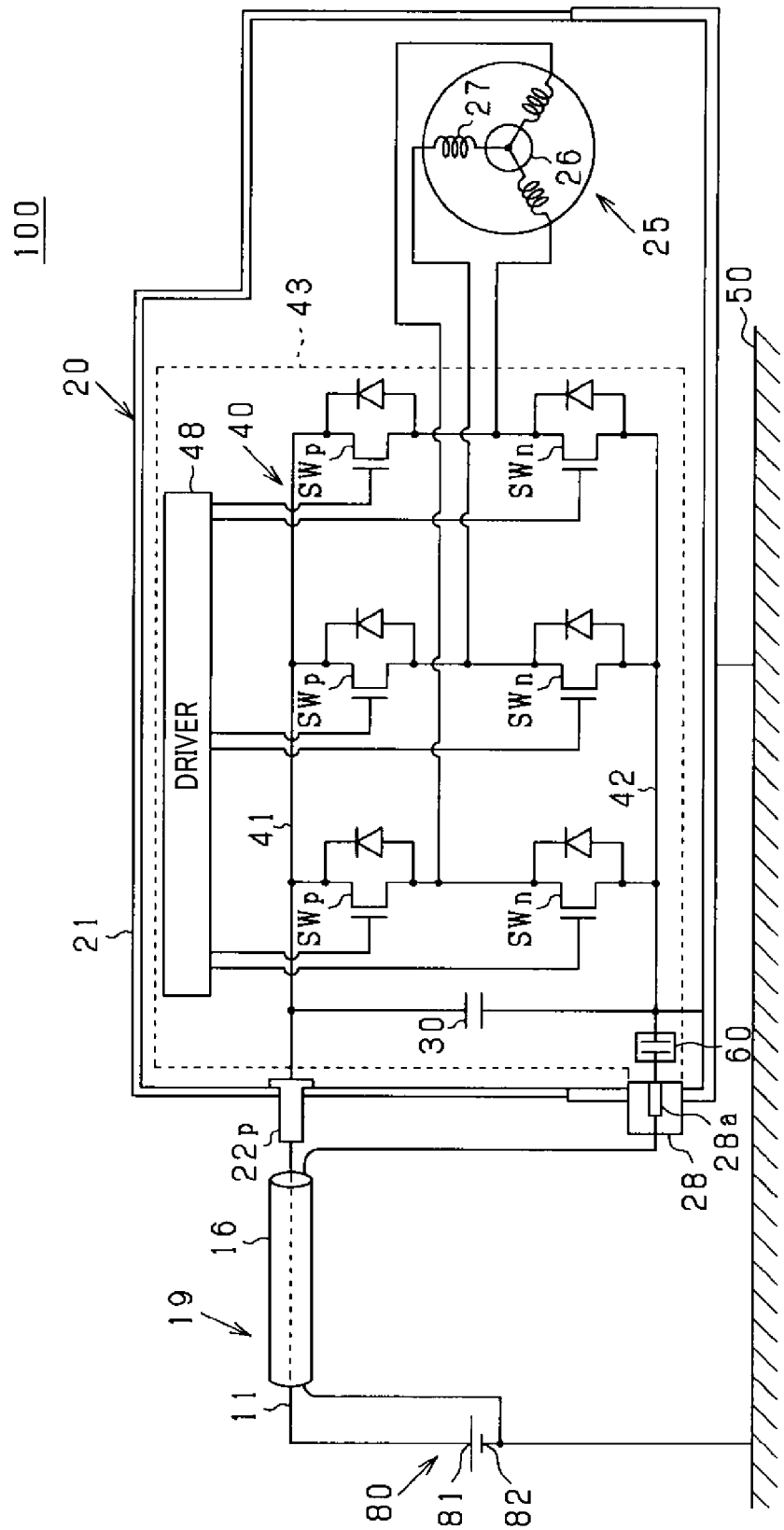
FIG. 14 is a diagram illustrating the configuration of a power control system according to a tenth embodiment.

FIG. 14 is a diagram illustrating the configuration of a power control system according to the tenth embodiment. Also in the power control system shown in FIG. 14, the auxiliary line 16 and the positive electrode side line 11 are integrated into the harness member 19. In addition, the auxiliary line 16 is a shielding line covering the positive electrode side line 11.

The ISG 20 includes a control board 43 and a control connector 28 connected to the control board 43. On the control board 43, a driver 48 and the inverter 40 having the high-electric potential side electrical path 41 and the low-electric potential side electrical path 42 are mounted. Although the driver 48 and the inverter 40 are mounted on the single control board 43 in the present embodiment, the driver 48 and the inverter 40 may be mounted on individual control boards.

It is noted that, in the present embodiment, the high-electric potential side terminal 22p is electrically connected not to the case 21 of the ISG 20 but to the high-electric potential side electrical path 41. Thereby, high-frequency current is prevented from flowing to the case 21.

The control connector 28 includes a plurality of terminals to which various signals input. The terminals are connected to electrical paths provided to the control board 43. Control signals are input to circuits mounted on the control board 43 through the terminals.

In the present embodiment, one of the plurality of terminals of the control connector 28 is an auxiliary terminal 28a. The auxiliary terminal 28a is connected to the low-electric potential side electrical path 42 of the control board 43. Hence, connecting the auxiliary line 16 to the auxiliary terminal 28a electrically connects the auxiliary line 16 and the control board 43.

On the control board 43, the capacitor 60 functioning as a DC component suppressing element is mounted. In the present embodiment, the capacitor 60 is mounted on an electrical path connecting the low-electric potential side electrical path 42 and the auxiliary terminal 28a. It is noted that, on the control board 43, a fuse may be mounted on an electrical path connecting the low-electric potential side electrical path 42 and the auxiliary terminal 28a. Also in the present embodiment, the low-electric potential side electrical path 42 is connected to the body ground 50 via the case 21. Specifically, the low-electric potential side electrical path 42 is connected to the case 21 at the position closer to the smoothing capacitor 30 than to the capacitor 60.

In the above configuration, a loop is formed which includes the battery 80, the positive electrode side line 11, the high-electric potential side electrical path 41, the low-electric potential side electrical path 42, the capacitor 60, the auxiliary terminal 28a, and the auxiliary line 16. In this loop, the capacitor 60 suppresses DC components flowing through the auxiliary line 16.

In the present embodiment, the capacitor 60 is mounted on the electrical path connecting the low-electric potential side electrical path 42 and the auxiliary terminal 28a, on the control board 43. Thus, compared with a case where the capacitor 60 is provided on the auxiliary line 16, the capacitor 60 can be easily provided on the loop (First Modification of the Tenth Embodiment)

In the first modification of the tenth embodiment, an EMI (electromagnetic interference) filter, which is a filter for noise countermeasures inside the ISG 20, is applied as a DC component suppressing element.

Figure 15:
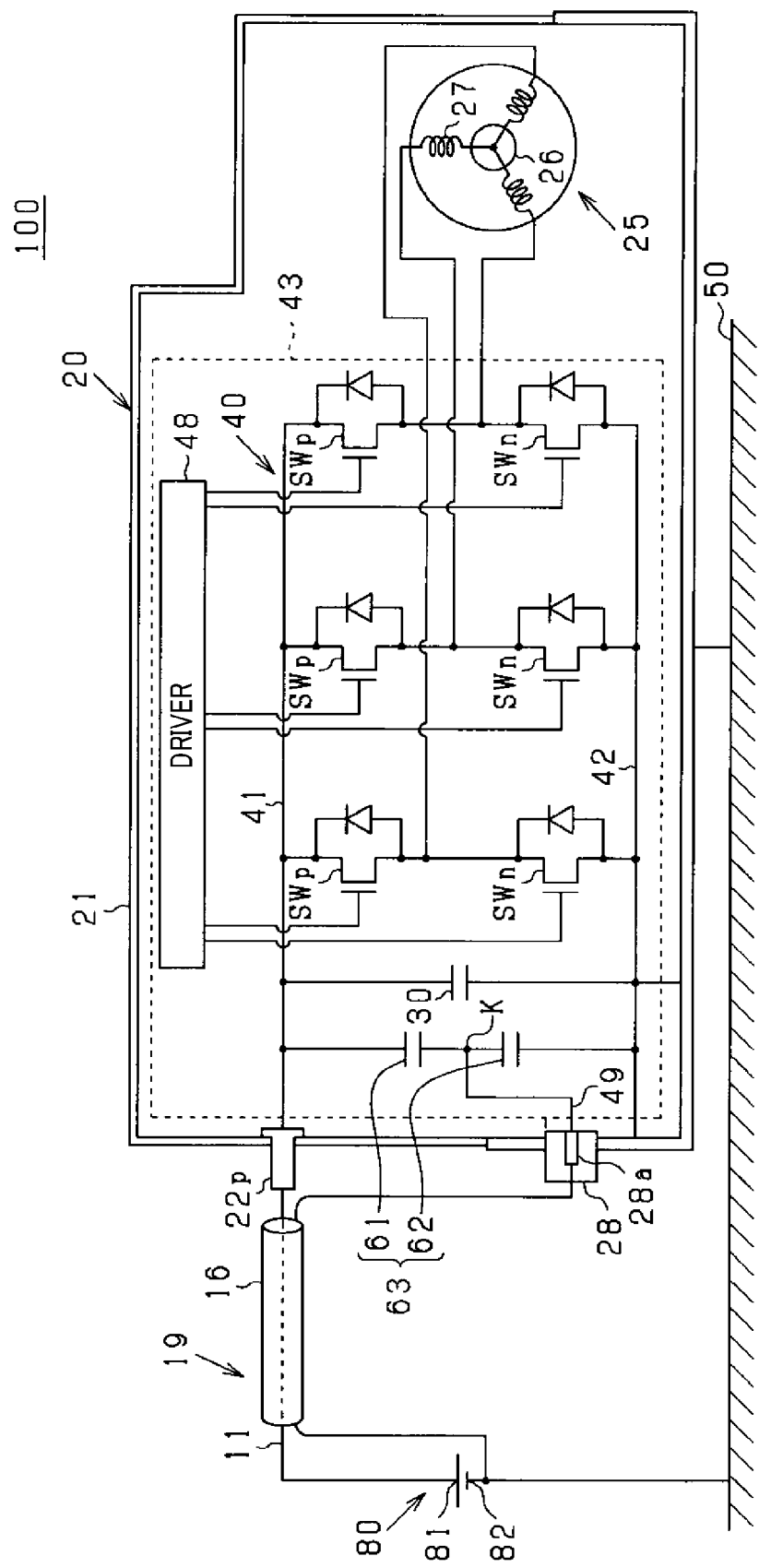
FIG. 15 is a diagram illustrating the configuration of a power control system according to a first modification of the tenth embodiment.

In FIG. 15, an EMI filter 63 connects the high-electric potential side electrical path 41 and the low-electric potential side electrical path 42. The EMI filter 63 is a series connection of a first filter capacitor 61 and a second filter capacitor 62. A connection point K between the first filter capacitor 61 and the second filter capacitor 62 is connected to the auxiliary terminal 28a via a relay line 49. The low-electric potential side electrical path 42 is electrically connected to the body ground 50 via the case 21 and not via the EMI filter 63. It is noted that the EMI filter 63 is configured by a series connection of two filter capacitors to avoid a short circuit between the high-electric potential side electrical path 41 and the low-electric potential side electrical path 42 when one of the two filter capacitors has caused a short-circuit failure.

In the above configuration, a loop is formed which includes the battery 80, the positive electrode side line 11, the high-electric potential side electrical path 41, the first filter capacitor 61, the relay line 49, the auxiliary terminal 28a, and the auxiliary line 16. In this loop, the first filter capacitor 61 suppresses DC components flowing through the auxiliary line 16.

In the present first modification, the first filter capacitor 61 configuring the EMI filter 63 is used as a DC component suppressing element. Hence, the EMI filter 63 can achieve a function of suppressing noise and a function of suppressing DC components flowing through the loop. As a result, compared with a case where the functions are achieved by individual components, the number of components can be reduced to decrease the power control system 100 in size.

It is noted that the EMI filter 63 may be configured by a series connection of three or more filter capacitors. In this case, the auxiliary terminal 28a may be connected to the connection point of adjacent two of the three or more filter capacitors via the relay line 49.

(Second Modification of the Tenth Embodiment)

Figure 16:
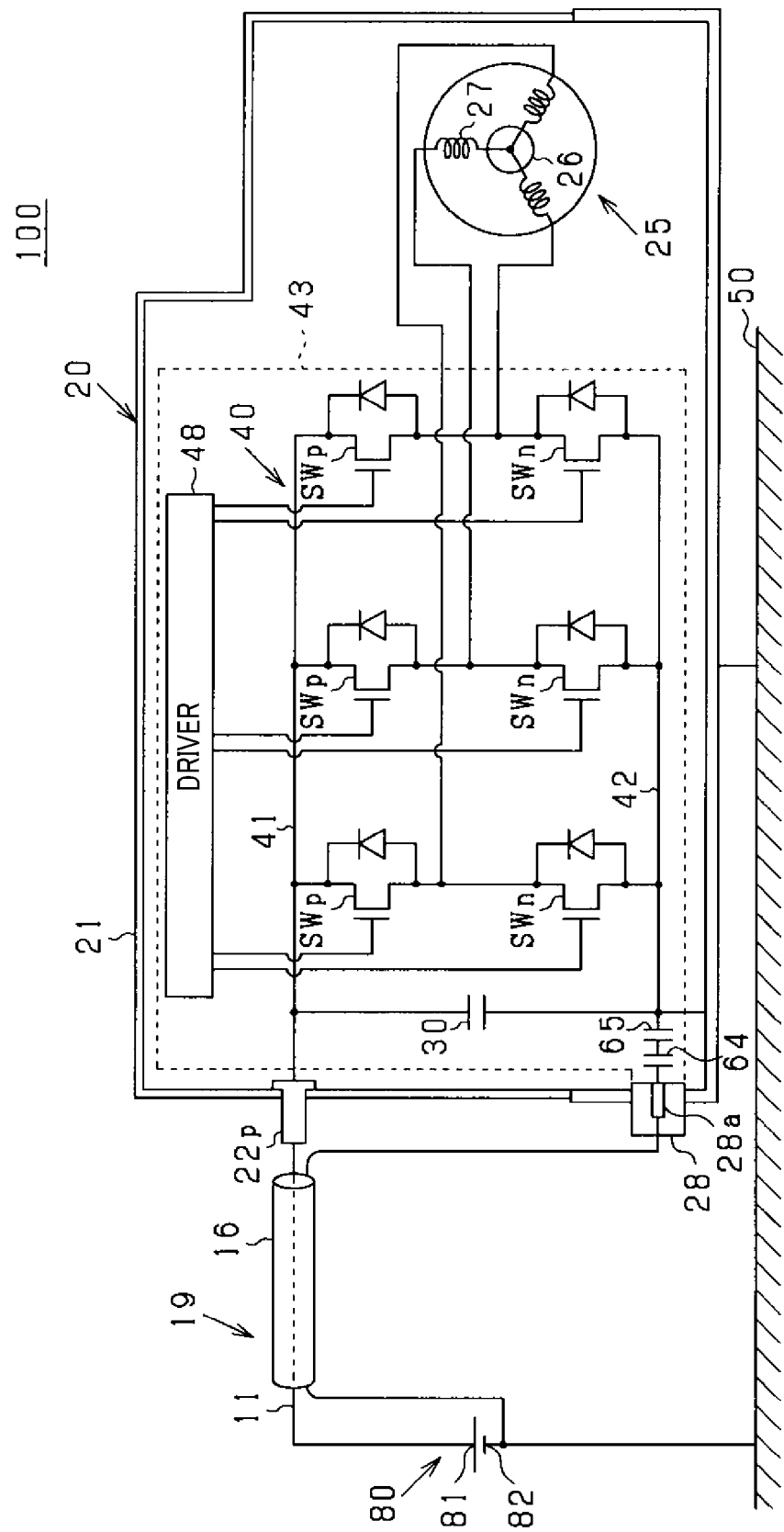
FIG. 16 is a diagram illustrating the configuration of a power control system according to a second modification of the tenth embodiment.

In the second modification of the tenth embodiment, the DC component suppressing element is configured by a series connection of a first suppression capacitor 64 and a second suppression capacitor 65. In FIG. 16, on the control board 43, a series connection of the first suppression capacitor 64 and the second suppression capacitor 65 are provided on an electrical path connecting the auxiliary terminal 28a and the low-electric potential side electrical path 42.

In the above configuration, a loop is formed which includes the battery 80, the positive electrode side line 11, the high-electric potential side electrical path 41, the low-electric potential side electrical path 42, the first suppression capacitor 64, the second suppression capacitor 65, auxiliary terminal 28a, and the auxiliary line 16. The first suppression capacitor 64 and the second suppression capacitor 65 suppress DC components flowing through the auxiliary line 16 in the loop.

In the present second modification, DC components flowing through the loop are suppressed by the series connection of the first and second suppression capacitors 64 and 65. Thereby, even when a short-circuit failure is caused in one of the first and second suppression capacitors 64 and 65, the other of the first and second suppression capacitors 64 and 65 suppresses the DC components. Hence, redundancy of the effect of suppressing DC components can be enhanced. It is noted that, in the second modification, the fuse 70 may not be provided on the auxiliary line 16. Also in this case, since two suppression capacitors are provided, a short-circuit failure caused in one of the two capacitors can be handled.

(Third Modification of the Tenth Embodiment)

In the third modification of the tenth embodiment, the DC component suppressing element is configured by combing the EMI filter 63 and a capacitor. Hereinafter, the capacitor combined with the EMI filter 63 is referred to as a safety capacitor 67.

Figure 17:
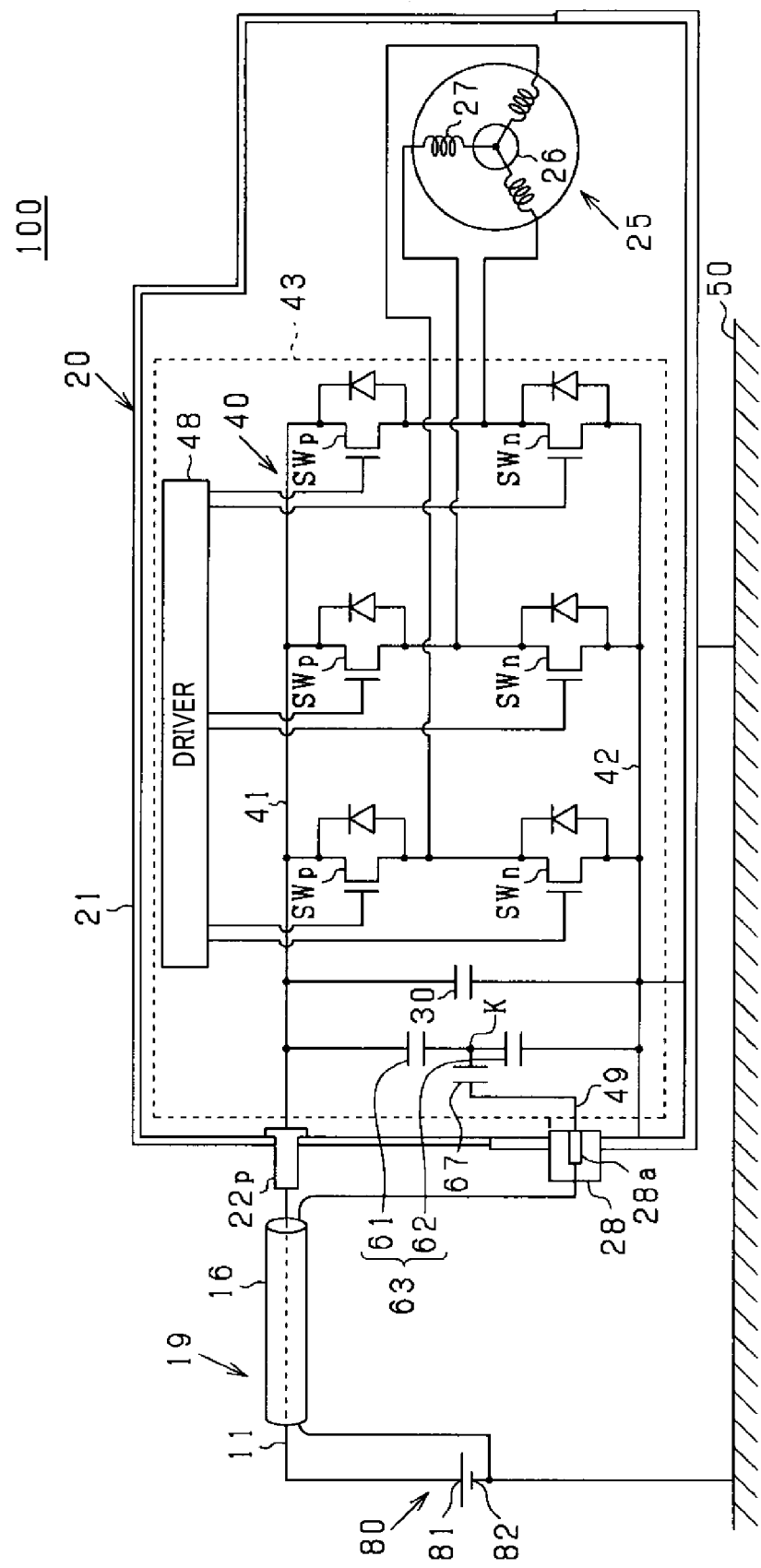
FIG. 17 is a diagram illustrating the configuration of a power control system according to a third modification of the tenth embodiment.

In FIG. 17, the high-electric potential side electrical path 41 and the low-electric potential side electrical path 42 are connected by the EMI filter 63. The first end of the safety capacitor 67 is connected to the connection point K between the first filter capacitor 61 and the second filter capacitor 62 configuring the EMI filter. The second end of the safety capacitor 67 is connected to the auxiliary terminal 28a via the relay line 49. Hence, the first filter capacitor 61 and the safety capacitor 67 are connected in series.

In the above configuration, a loop is formed which includes the battery 80, the positive electrode side line 11, the high-electric potential side electrical path 41, the first filter capacitor 61, the safety capacitor 67, the relay line 49, the auxiliary terminal 28a, and the auxiliary line 16. In this loop, the first filter capacitor 61 and the safety capacitor 67 suppress DC components flowing through the auxiliary line 16.

In the present third modification, a DC component suppressing element is configured by the first filter capacitor 61 configuring the EMI filter 63 and the safety capacitor 67. Thereby, even when a short-circuit failure is caused in one of the first filter capacitor 61 and the safety capacitor 67, the other of the first filter capacitor 61 and the safety capacitor 67 suppresses the DC components. Hence, redundancy of the effect of suppressing DC components can be enhanced.

It is noted that, in FIG. 17, the safety capacitor 67 may be provided not inside the case 21 but, for example, in the auxiliary line 16 provided outside the case 21.

Eleventh Embodiment

In this eleventh embodiment, the configurations different from those of the tenth embodiment will be mainly described.

Figure 18:
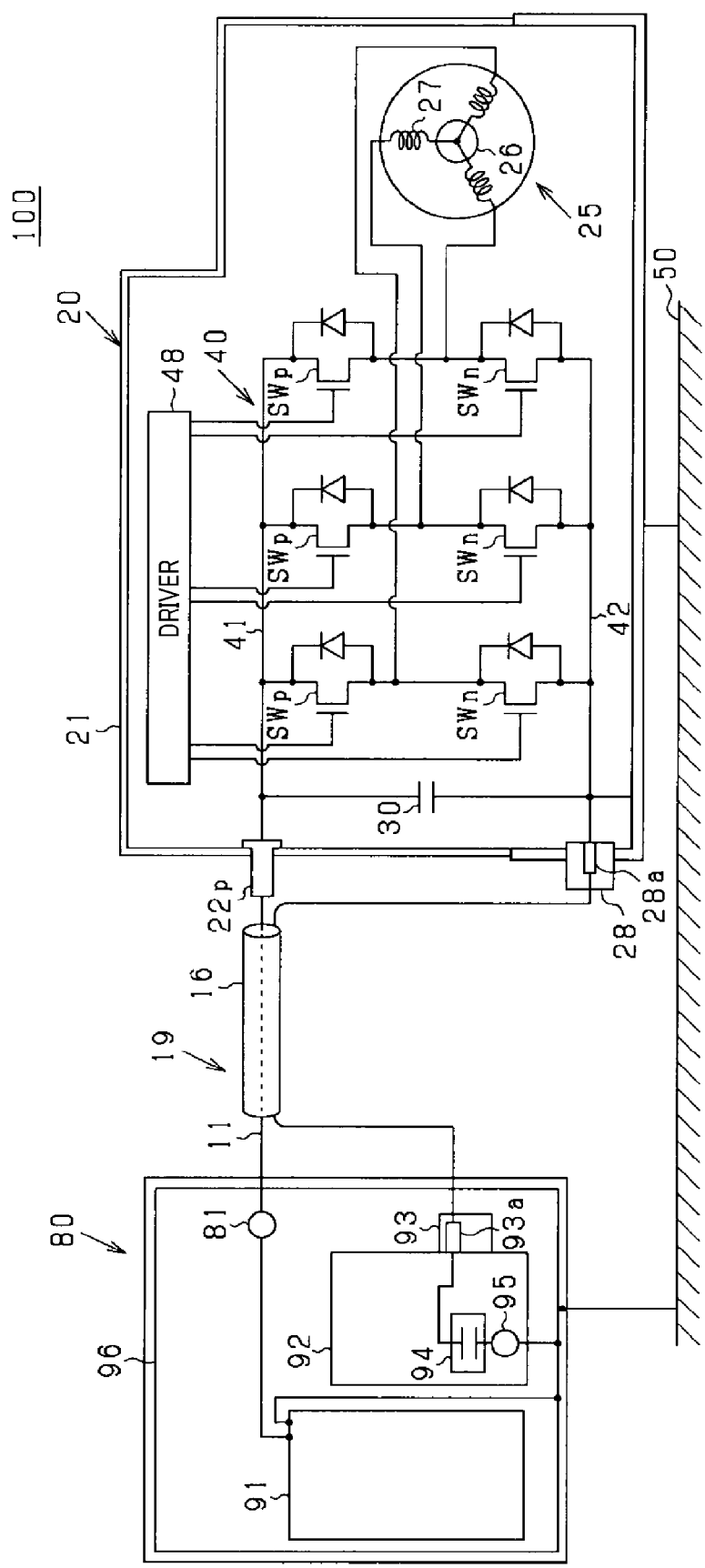
FIG. 18 is a diagram illustrating the configuration of a power control system according to an eleventh embodiment.

In the eleventh embodiment, the DC component suppressing element is mounted on a board configuring the battery 80. FIG. 18 is a diagram illustrating the configuration of the power control system 100 according to the eleventh embodiment. In FIG. 18, the battery 80 is configured as a battery unit including an assembled battery 91, a board 92, a battery connector 93, the positive electrode terminal 81, the negative electrode terminal 82, and a case 96.

The assembled battery 91 is configured by a series connection of a plurality of battery cells. The positive electrode terminal of the assembled battery 91 is connected to the positive electrode terminal 81, and the negative electrode terminal of the assembled battery 91 is connected to the case 96. The case 96 is connected to the body ground 50.

The board 92 is connected with a unit that monitors current, voltage, temperature and the like concerning the assembled battery 91 and detects an anomalous state, a leakage and the like of the assembled battery 91. Specifically, the board 92 is connected with a current sensor detecting current of the assembled battery 91, a voltage sensor detecting voltage of the assembled battery 91, and a temperature sensor detecting temperature of the assembled battery 91 via the battery connector 93.

The battery connector 93 includes a plurality of terminals connected to electrical paths on the board 92. Some of the terminals are respectively connected to the voltage sensor, the current sensor, and the temperature sensor. In the present embodiment, one of the terminals of the battery connector 93 is used as an auxiliary terminal 93a connected to the auxiliary line 16.

A capacitor 94 is mounted on the board 92. The first end of the capacitor 94 is connected to the auxiliary terminal 93a of the battery connector 93, and the second end of the capacitor 94 is connected to a ground pattern 95. The ground pattern 95 is connected to the case 96 connected to the body ground 50. The auxiliary line 16 is electrically connected to the body ground 50 via the auxiliary terminal 93a, the capacitor 94, and the ground pattern 95.

According to the above configuration, a loop is formed which includes the assembled battery 91, the positive electrode terminal 81, the positive electrode side line 11, the high-electric potential side electrical path 41, the low-electric potential side electrical path 42, the auxiliary line 16, the auxiliary terminal 93a, and the capacitor 94. In this loop, the capacitor 94 suppresses DC components flowing through the auxiliary line 16.

In the present embodiment, the capacitor 94 functioning as the DC component suppressing element is mounted on the board 92. Thereby, connecting the positive electrode side line 11 and the auxiliary line 16 can provide the capacitor 60 on the loop. Thus, compared with the case where the capacitor 94 is provided to the auxiliary line 16, the capacitor 94 can be easily provided to the loop.

Twelfth Embodiment

In this twelfth embodiment, the configurations different from those of the tenth embodiment will be mainly described.

Figure 19:
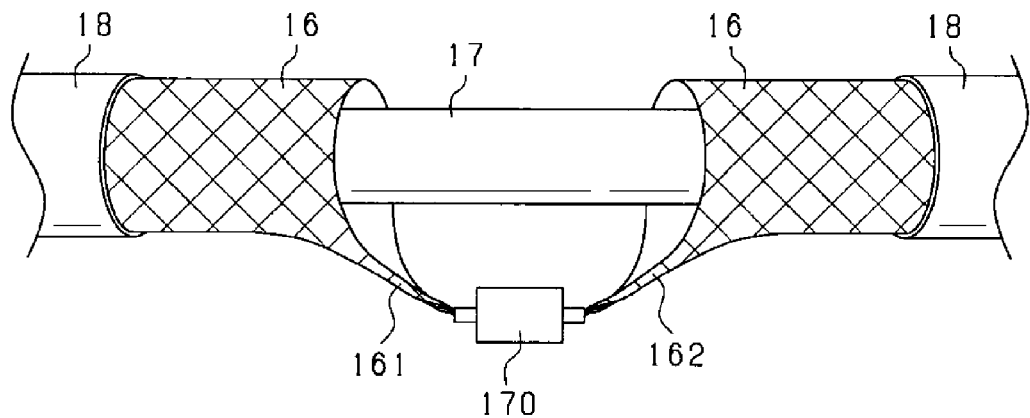
FIG. 19 is a diagram illustrating the configuration of a harness member according to a twelfth embodiment.

FIG. 19 is a diagram illustrating the configuration of the harness member 19 according to the twelfth embodiment. As shown in FIGS. 5 and 6, the positive electrode side line 11, the inner insulation part 17, the auxiliary line 16, and the outer sheath part 18 are integrated into the harness member 19.

In the present embodiment, the auxiliary line 16 is separated into two pieces, which are connected by a capacitor 170, which is a passive component. In the present embodiment, the capacitor 170 is a ceramic capacitor. It is noted that, in FIG. 19, part of the outer sheath 18 in the vicinity of the capacitor 170 is not shown for the sake of convenience.

The auxiliary line 16 includes a first linear portion 161 and a second linear portion 162. Part of each of the first linear portion 161 and the second linear portion 162 is bound so as to be a linear shape. Specifically, twisting wires forming the auxiliary line 16 in one direction forms the first and second linear portions 161 and 162 bound in the radial direction of the positive electrode side line 11. The first linear portion 161 and the second linear portion 162 are connected by the capacitor 170. In the auxiliary line 16 shown in FIG. 19, the first linear portion 161 is connected to the negative electrode terminal 82 side of the battery 80, and second linear portion 162 is connected to the auxiliary terminal 28a side of the second linear portion 162.

In the present embodiment, the auxiliary line 16 is provided with the linear portions 161 and 162 bound in linear shapes, and the linear portions 161 and 162 are connected by the capacitor 170. Thus, capacitor 170 can suppress DC components flowing through the auxiliary line 16.

(First Modification of the Twelfth Embodiment)

Figure 20:
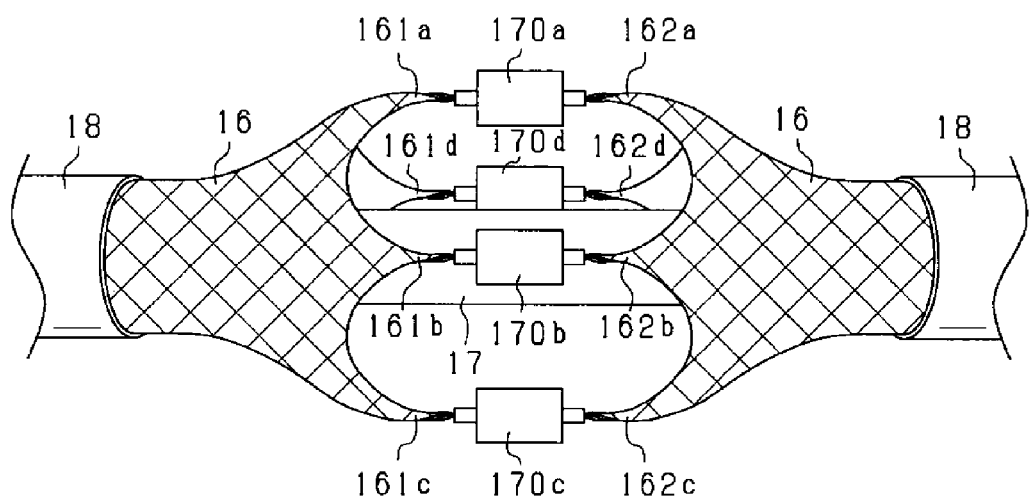
FIG. 20 is a diagram illustrating the configuration of a harness member according to a first modification of the twelfth embodiment.

In the first modification of the twelfth embodiment, the auxiliary line 16 is provided with a plurality of first and second linear portions 161 and 162, and each of the pairs of the first and second linear portions 161 and 162 is connected by a capacitor. FIG. 20 is a diagram illustrating the auxiliary line 16 as the first modification of the twelfth embodiment. In FIG. 20, part of the outer sheath part 18 in the vicinity of the capacitor is not shown for the sake of convenience.

In FIG. 20, the auxiliary line 16 is provided with four first linear portions 161a, 161b, 161c, 161d and four second linear portions 162a, 162b, 162c, 162d so as to surround the positive electrode side line 11 in the circumferential direction. In addition, pairs of the first linear portions 161a to 161d and the second linear portions 162a to 162d are respectively connected by capacitors 170a, 170b, 170c, 170d.

It is noted that connecting the four capacitors 170a to 170d to the auxiliary line 16 is one example. Three or less or five or more capacitors may be connected to the auxiliary line 16.

In the first modification, the positive electrode side line 11 is surrounded by the first linear portions 161a to 161d and the second linear portions 162a to 162d. Thus, the first linear portions 161a to 161d and the second linear portions 162a to 162d can further suppress noise radiation from the positive electrode side line 11 to the outside thereof.

(Second Modification of the Twelfth Embodiment)

Figure 21A:
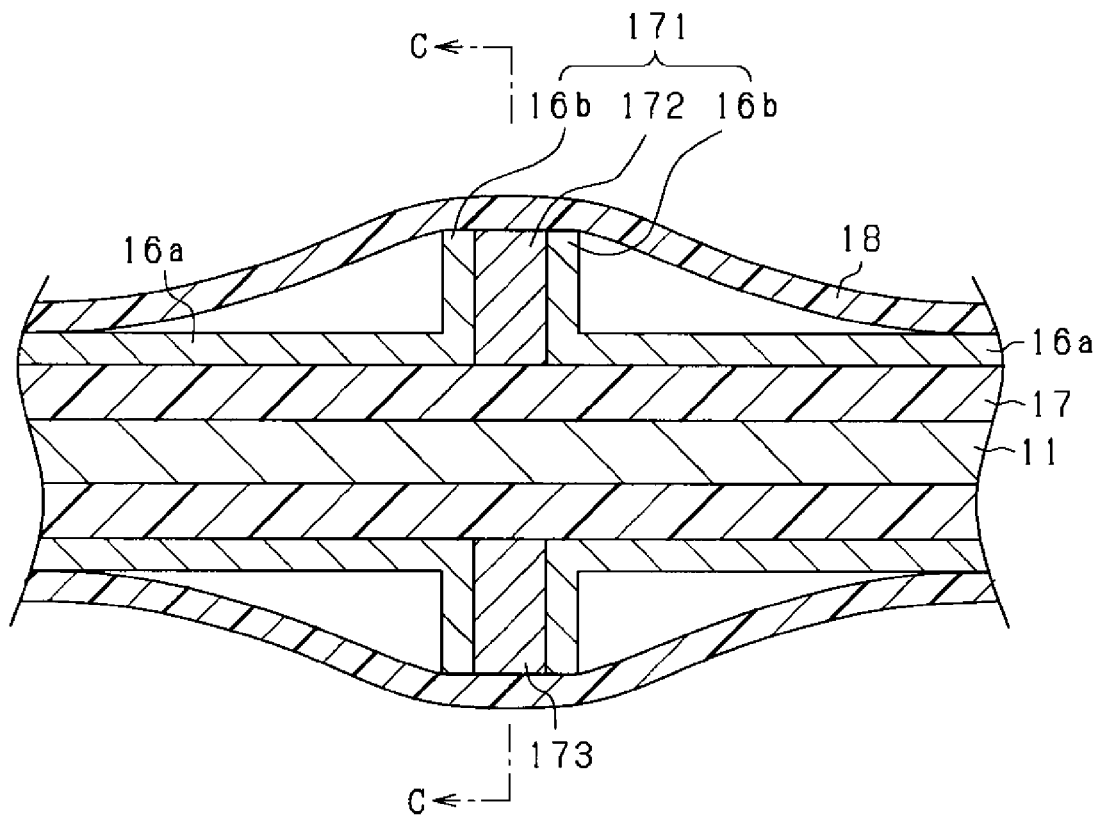
FIGS. 21A and 21B are diagrams illustrating the configuration of a harness member according to a second modification of the twelfth embodiment.
Figure 21B:
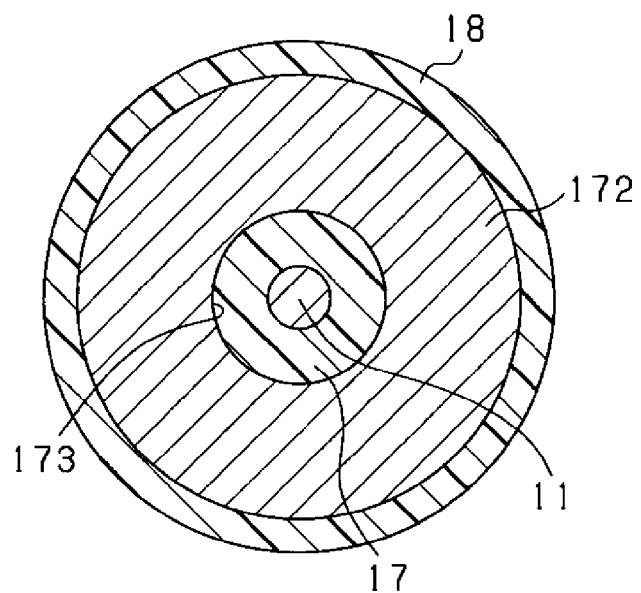

In the second modification of the twelfth embodiment, as shown in FIGS. 21A and 21B, the auxiliary line 16 is provided with a capacitance part 171 including capacitive components. The capacitance part 171 suppresses DC components. The capacitance part 171 is formed by expanding part of the auxiliary line 16 in the radial direction of the positive electrode side line 11. FIGS. 21A and 21B are diagrams illustrating the configuration of the harness member 19 according to the second modification of the twelfth embodiment. FIG. 21B is a C-C line section view of FIG. 21A.

In the present embodiment, the auxiliary line 16 is separated into two pieces. One piece of the auxiliary line 16 is connected to the auxiliary terminal 28a, and the other piece of the auxiliary line 16 is connected to the negative electrode terminal 82 of the battery 80. Each piece of the auxiliary line 16 includes a cylindrical part 16a and a flange part 16b. The cylindrical parts 16a cover the inner insulation part 17 over the outer surface thereof. The flange parts 16b extend in the radial direction from ends of the cylindrical parts 16a. The flange part 16b has an annular shape and functions as an electrode part. Between the flange parts 16b, a dielectric 172 is provided which electrically insulates the flange parts 16b. The flange parts 16b and the dielectric 172 configure the capacitance part 171. It is noted that the flange parts 16b may be formed by circularly extending wires configuring the auxiliary line 16 in the radial direction of the positive electrode side line 11.

The dielectric 172 has the same outside dimension as that of the flange parts 16b and has an annular shape. At the center of the dielectric 172, a through hole 173 is formed. The positive electrode side line 11 is inserted into the through hole 173. It is noted that the dielectric 172 is formed of material having insulation properties and a dielectric constant, such as plastics, ceramics, or mica.

In the capacitance part 171 having the above configuration, the current flowing through the auxiliary line 16 distributes positive charges to the battery 80 side of the flange part 16b and distributes negative charges to the auxiliary terminal 28a side of the flange part 16b. Hence, charges are accumulated in the capacitance part 171. In this case, the capacitance of the capacitance part 171 is a value depending on the area of the opposed flange parts 16b, the distance between the flange parts 16b, and the dielectric constant of the dielectric 172.

In the present second modification, configuring the capacitance part 171 functioning as a DC component suppressing element by using part of the auxiliary line can suppressing DC components flowing through the loop without using a capacitor, which is a passive element.

Thirteenth Embodiment

In this thirteenth embodiment, the configurations different from those of the tenth embodiment will be mainly described.

Figure 22:
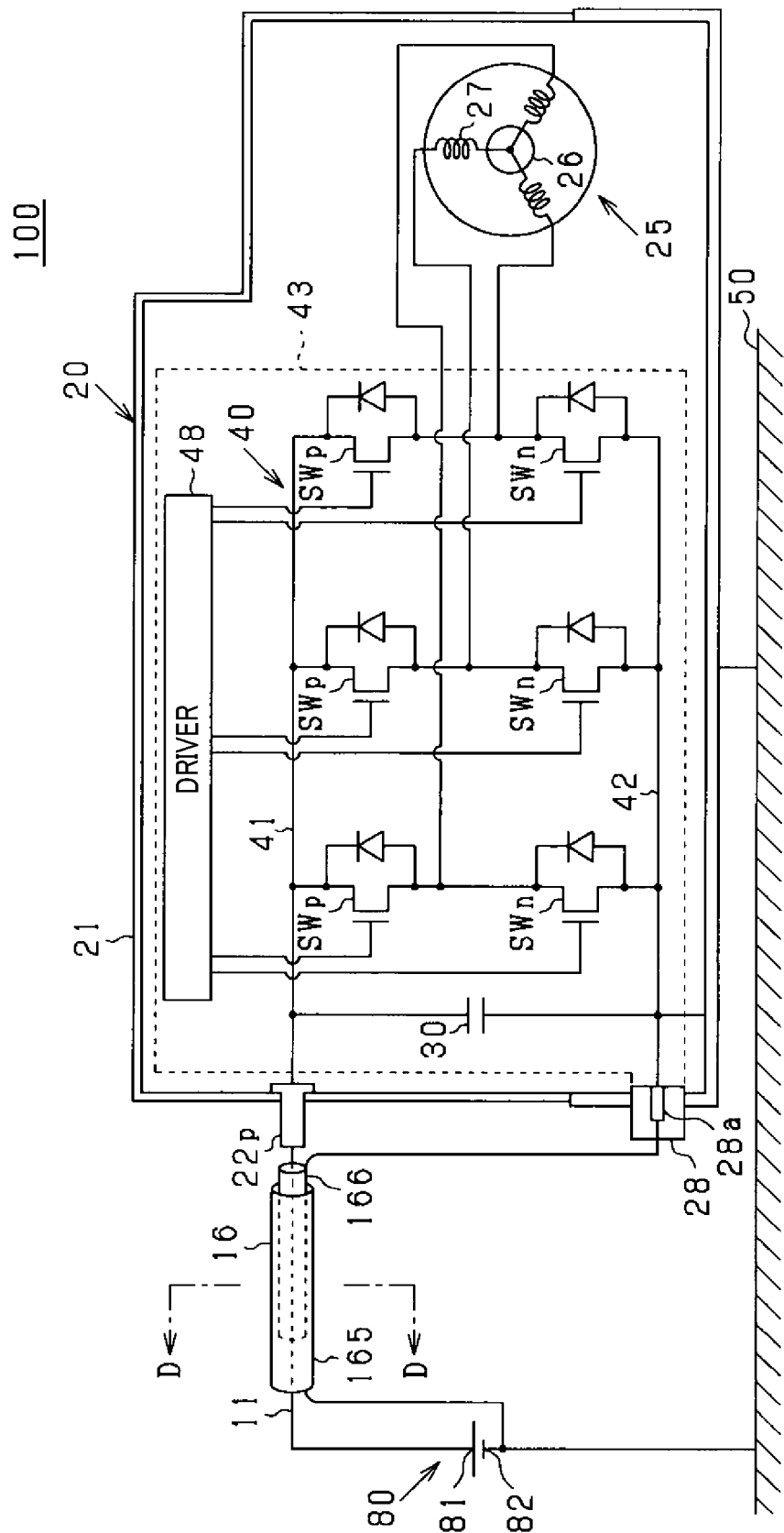
FIG. 22 is a diagram illustrating the configuration of a power control system according to a thirteenth embodiment.
Figure 23:
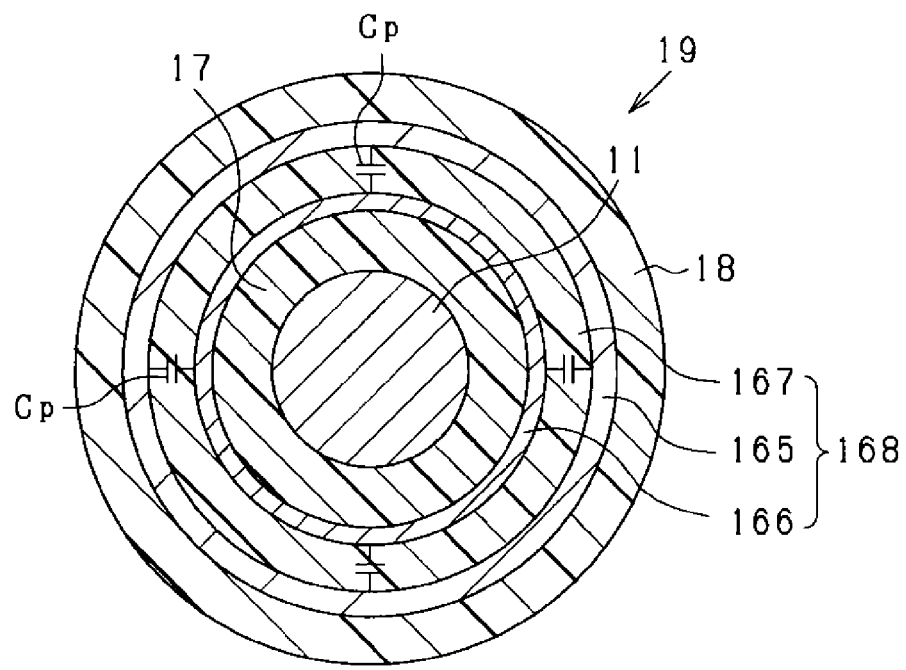
FIG. 23 is a diagram illustrating the configuration of an auxiliary line according to the thirteenth embodiment.

In the thirteenth embodiment, DC components are suppressed by parasitic capacitance generated in the auxiliary line 16. FIG. 22 is a diagram illustrating the configuration of a power control system according to the thirteenth embodiment. FIG. 23 is a D-D line section view of FIG. 22.

As shown in FIG. 22 and FIG. 23, the auxiliary line 16 includes circular first shielding line 165 and second shielding line 166. The first shielding line 165 and the second shielding line 166 are arranged along the direction in which the positive electrode side line 11 extends.

The first line 165 covers the inner insulation part 17. The first end of the first shielding line 165 is connected to the negative electrode terminal 82 of the battery 80. The second end of the first shielding line 165 opens without being electrically connected to any member.

The second shielding line 166 is arranged inside the first shielding line 165 and in the radial direction of the positive electrode side line 11. The first end of the second shielding line 166 is connected to the auxiliary terminal 28a. The second end of the second shielding line 166 opens without being electrically connected to any member.

As shown in FIG. 23, the inner diameter of the first shielding line 165 is larger than the outer diameter of the second shielding line 166, and the inner diameter of the second shielding line 166 is larger than the outer diameter of the positive electrode side line 11. The open end of the first shielding line 165 covers the open end of the second shielding line 166. Hence, the first shielding line 165 and the second shielding line 166 overlap with each other in the direction in which the positive electrode side line 11 extends in a state where the second shielding line 166 is positioned inside and the first shielding line 165 is positioned outside.

The inner insulation part 17 formed of a material having electrical insulation characteristics is provided between the positive electrode side line 11 and the second shielding line 166. In the area where the first shielding line 165 and the second shielding line 166 overlap with each other, the auxiliary line 16 includes a dielectric 167 interposed between the first shielding line 165 and the second shielding line 166. The dielectric 167 is formed of a material such as synthetic resin and electrically insulates the first shielding line 165 and the second shielding line 166 from each other.

Since the first shielding line 165 and the second shielding line 166 are insulated from each other by the dielectric 167, the area where the first shielding line 165 and the second shielding line 166 overlap with each other functions as a capacitance generating part 168 that generates parasitic capacitance Cp. Specifically, positive charges are distributed to the second shielding line 166, and negative charges are distributed to the first shielding line 165. Hence, in the capacitance generating part 168, charges are accumulated between the first shielding line 165 and the second shielding line 166.

The capacitance of the capacitance generating part 168 is a value depending on the area where the first shielding line 165 and the second shielding line 166 overlap with each other, the distance between the first shielding line 165 and the second shielding line 166, and the dielectric constant of the dielectric 167.

Figure 24:
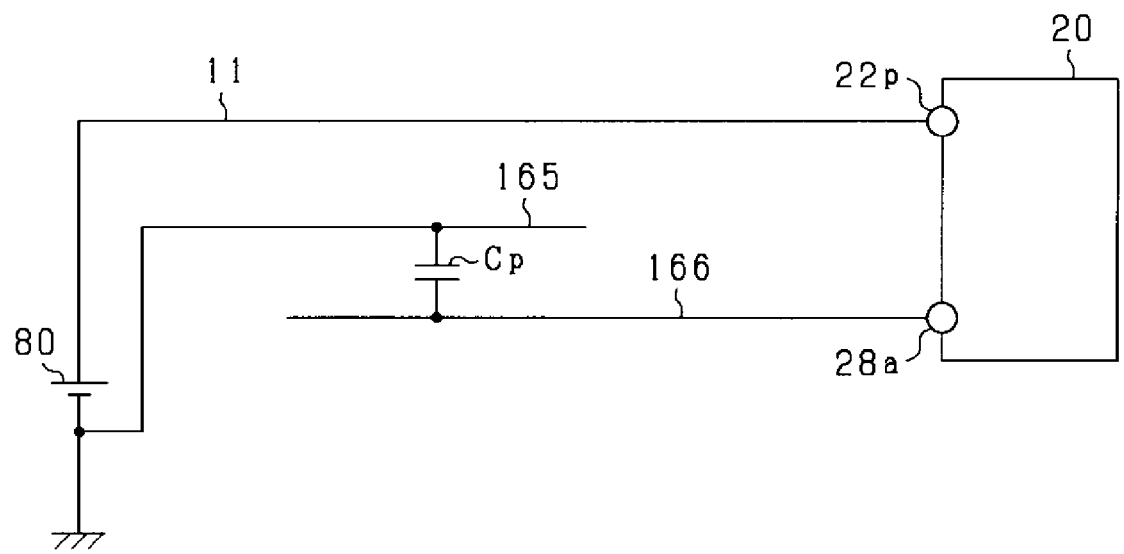
FIG. 24 is a diagram showing an equivalent circuit of a power control system according to the thirteenth embodiment.

FIG. 24 shows an equivalent circuit of the power control system 100. The first shielding line 165 and the second shielding line 166 are connected in series by the parasitic capacitance Cp generated between the first shielding line 165 and the second shielding line 166. Hence, a loop is formed which includes the battery 80, the positive electrode side line 11, the second shielding line 166, and the first shielding line 165. The capacitance Cp suppresses DC components flowing through the second shielding line 166.

According to the present embodiment, the auxiliary line 16 forms the capacitance generating part 168 by the first shielding line 165, the second shielding line 166, and the dielectric 167. The capacitance generating part 168 suppresses the DC components. Hence, a capacitor serving as a DC component suppressing element is not necessary. In addition, since the first shielding line 165 and the second shielding line 166 cover the outer periphery of the positive electrode side line 11, noise radiation from the positive electrode side line 11 to the outside thereof can be further suppressed.

It is noted that the first shielding line 165 and the second shielding line 166 may overlap with each other in the direction in which the positive electrode side line 11 extends in a state where the second shielding line 166 is positioned outside and the first shielding line 165 is positioned inside.

(Modification of the Thirteenth Embodiment)

Figure 25:
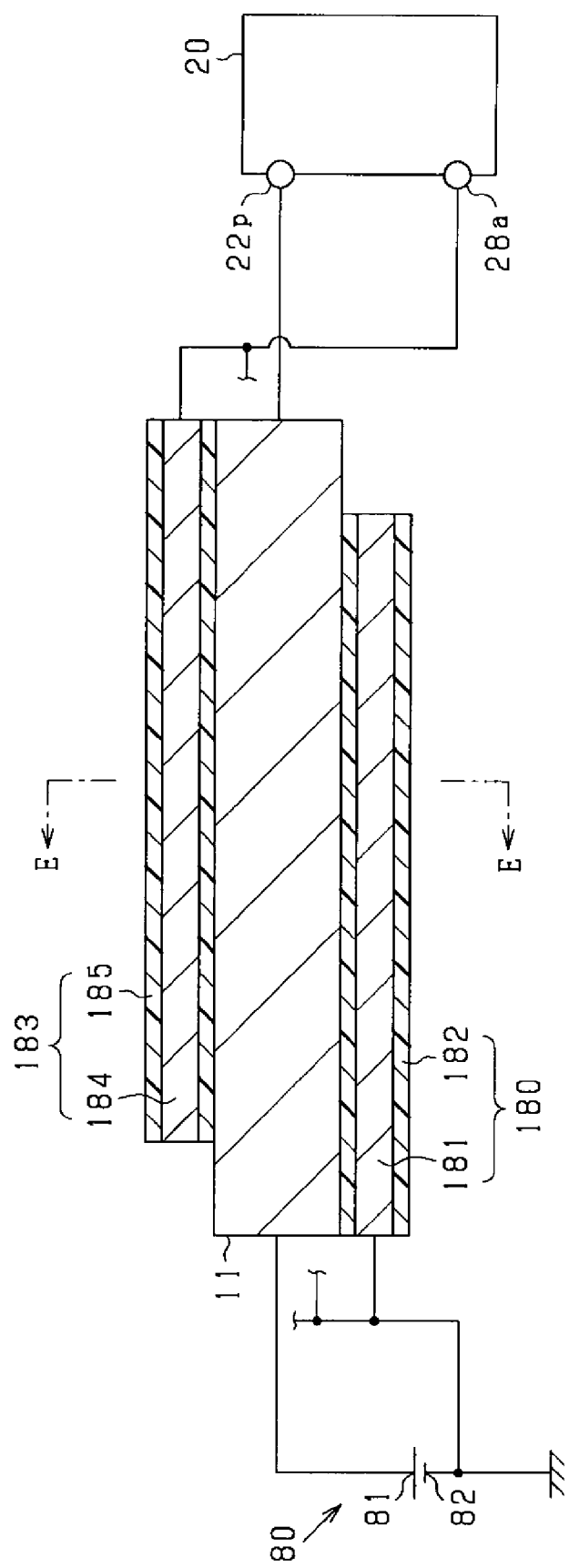
FIG. 25 is a diagram illustrating the configuration of a power control system according to a modification of the thirteenth embodiment.
Figure 26:
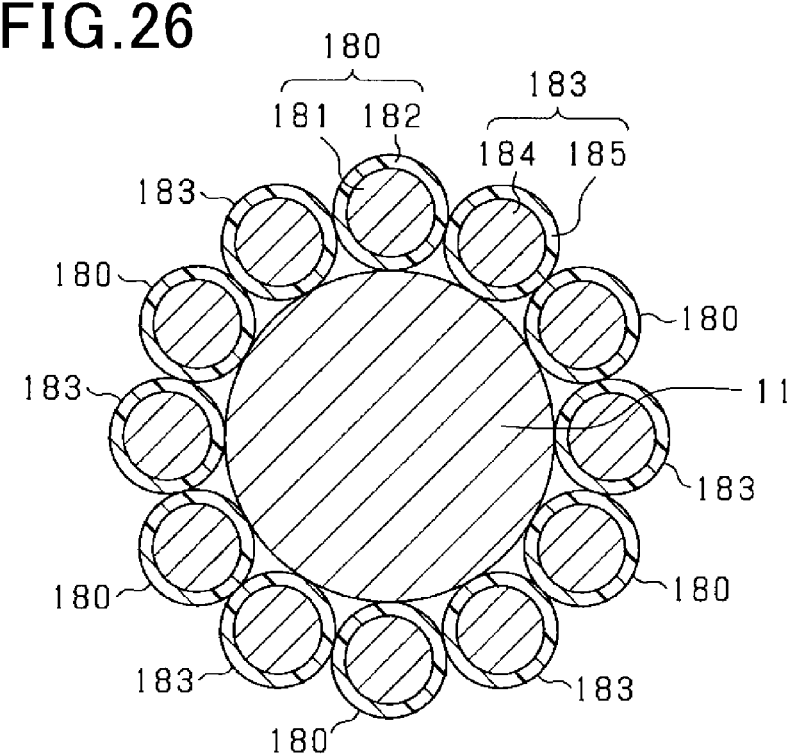
FIG. 26 is a diagram illustrating the configuration of an auxiliary line according to a modification of the thirteenth embodiment.

In the modification of the thirteenth embodiment, the auxiliary line 16 includes a plurality of first lines 180 and a plurality of second lines 183 and suppresses DC components by the capacitance Cp generated between the lines 180 and 183. In the present embodiment, the number of the first lines 180 and the number of the second lines 183 are the same. FIG. 25 shows a case where six first lines 180 and six second lines 183 are arranged. FIG. 25 is a diagram illustrating the harness member 19 according to the modification of the thirteenth embodiment. In FIG. 25, a section view of the harness member 19 is shown for the sake of convenience. FIG. 26 is an E-E section view of FIG. 25. It is noted, in FIG. 25, the inner insulation part 17 covering the positive electrode side line 11 is not shown The first lines 180 and the second lines 183 are arranged along the direction in which the positive electrode side line 11 extends. The first lines 180 and the second lines 183 are, for example, AV cables (low voltage cable for automobiles) whose section view is a circular shape.

Each of the first lines 180 has a first conductor 181 and a first covering part 182 covering the first conductor 181. The first covering part 182 is formed of a material having electrical insulation characteristics (e.g. synthetic resin). Each of the second lines 183 includes a second conductor 184, and a second covering part 185 covering the second conductor 184. The second covering part 185 is formed of a material having electrical insulation characteristics (e.g. synthetic resin).

As shown in FIG. 26, the first lines 180 and the second lines 183 are alternately arranged so as to surround the outer periphery of the positive electrode side line 11. In FIG. 26, six pairs of lines are shown, the pair being a set of one first line 180 and one second line 183.

The first ends of the first conductors 181 are electrically connected to the negative electrode terminal 82 of the battery 80, and the second ends of the first conductors 181 open. The first ends of the second conductors 184 are connected to the auxiliary terminal 28a, and the second ends of the second conductors 184 open. The first and second conductors 181 and 184 are formed of, for example, core wires.

In the auxiliary line 16, the first covering part 182 and the second covering part 185 are interposed between the first conductor 181 and the second conductor 184. Hence, the capacitance Cp is generated between the first line 180 and the second line 183. In the present embodiment, the first covering part 182 and the second covering part 185 correspond to an insulation part functioning as a dielectric.

Figure 27:
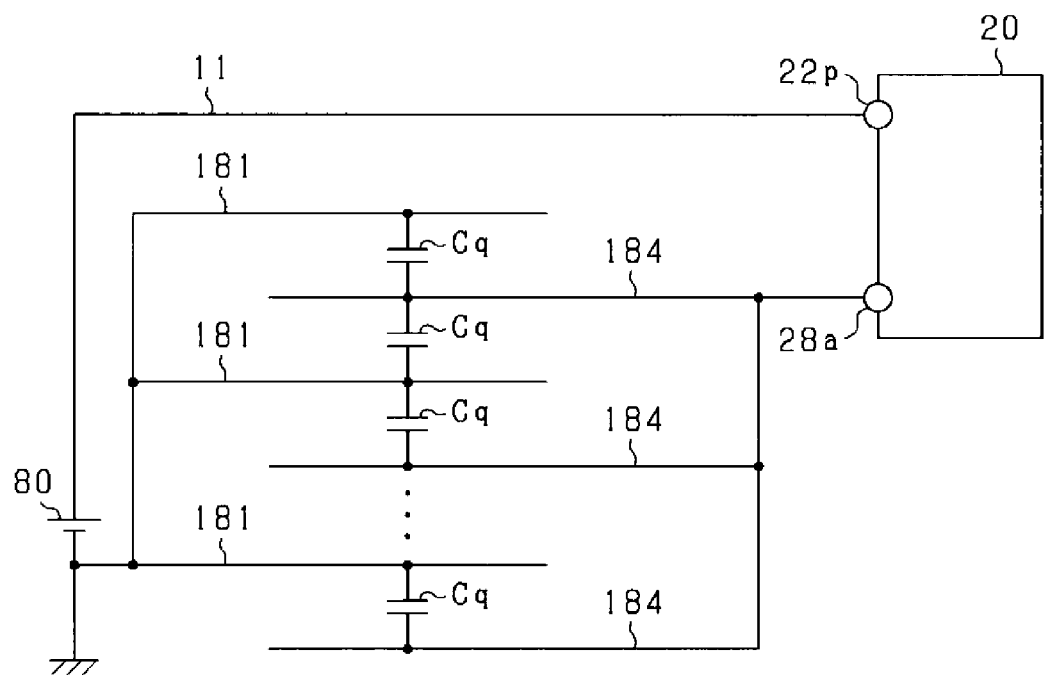
FIG. 27 is a diagram showing an equivalent circuit of a power control system according to a modification of the thirteenth embodiment.

FIG. 27 shows an equivalent circuit of the power control system 100 according to the present modification. The first conductor 181 and the second conductor 184 are connected in series by the capacitance Cp generated between the first conductor 181 and the second conductor 184. Hence, a loop is formed which includes the battery 80, the positive electrode side line 11, the second conductor 184, and the first conductor 181. The capacitance Cp suppresses the DC components flowing through the second conductor 184. In addition, in the present modification, the capacitance Cp is generated depending on the number of the first lines 180 and the second lines 183.

In the present modification, since the DC components flowing through the auxiliary line 16 is suppressed by the capacitance Cp generated between the plurality of the first conductors 181 and second conductors 184, a capacitor serving as a DC component suppressing element is not necessary. In addition, since the circumference of the positive electrode side line 11 is covered with the plurality of first lines 180 and second lines 183, noise radiation from the positive electrode side line 11 to the outside thereof can be further suppressed.

Fourteenth Embodiment

When the case 21 of the IDG 20 has an opening, the auxiliary line 16 may be inserted from the opening into the case 21 so as to be connected to a capacitor of the control board 43. For example, when the IDG 20 has a heat radiation opening, the auxiliary line 16 may be inserted into the case of the IDG 20 through the heat radiation opening. The inserted auxiliary line 16 may be connected to a capacitor including the control board 43.

Other Embodiments

Although an ISG is used as a drive circuit, which is an example, a circuit generating noise may be used such as a motor and a switching circuit.

The in-vehicle apparatus may be, instead of the ISG and the DC/DC converter 200 described above, a starter for starting an engine, an alternator, or a radiator fan.

As the DC component suppressing element, an element may be used which can suppress DC components flowing through the auxiliary line 15, such as an element functioning as resistance or a capacitive component.

It will be appreciated that the present invention is not limited to the configurations described above, but any and all modifications, variations or equivalents, which may occur to those who are skilled in the art, should be considered to fall within the scope of the present invention.

Hereinafter, an aspect of the above-described embodiments will be summarized.

As an aspect of the embodiment, an in-vehicle apparatus is provided which is installed in a vehicle including a power supply (80). The apparatus includes: at least one drive circuit (40, 210 to 240) that is driven by DC voltage supplied from the power supply (80), and a positive electrode side line (11) that electrically connects a positive electrode terminal of the power supply and a high-electric potential side electrical path (41) of the drive circuit. A negative electrode terminal of the power supply and a low-electric potential side electrical path (42) of the drive circuit are electrically connected to a body ground (50) of the vehicle. The apparatus includes an auxiliary line (15) that has a first end electrically connected to the positive electrode terminal or the negative electrode terminal and a second end connected to the high-electric potential side electrical path or the body ground, and that is arranged along the positive electrode side line or the body ground.

In the configuration in which the positive electrode terminal of the power supply and the high-electric potential side electrical path of the drive circuit are electrically connected by the positive electrode side line, and the negative electrode terminal of the power supply and the low-electric potential side electrical path of the drive circuit are electrically connected to the body ground, a loop path including the positive electrode side line and the body ground is formed. When the drive circuit is driven, high-frequency current flows to the loop, whereby the loop path acts as an antenna to radiate noise. In this regard, according to the above embodiment, the first end of the auxiliary line is electrically connected to the positive electrode terminal or the negative electrode terminal of the power supply, and the second end of the auxiliary line is electrically connected to the high-electric potential side electrical path of the drive circuit or the body ground. In addition, the auxiliary line is arranged so as to be along the positive electrode side line or the body ground. According to this configuration, the area of the loop path acting as an antenna can be smaller than the area of the loop path including the positive electrode side line and the body ground. Then, the auxiliary line is arranged so as to be along the positive electrode side line and the body ground, whereby the mutual inductance between the positive electrode side line and the auxiliary line can be large to make small the inductance between the lines. As a result, the magnetic field generated around the lines can be suppressed, whereby noise radiation can be reduced. In addition, also in an in-vehicle apparatus driven by a large current, using these lines can prevent the apparatus from becoming large compared with a case where a noise filter is used.

What is claimed is:

1. An in-vehicle apparatus installed in a vehicle including a power supply, the apparatus comprising:
   at least one drive circuit that is driven by DC voltage supplied from the power supply, and
   a positive electrode side line that electrically connects a positive electrode terminal of the power supply and a high-electric potential side electrical path of the drive circuit, wherein
   a negative electrode terminal of the power supply and a low-electric potential side electrical path of the drive circuit are electrically connected to a body ground of the vehicle, and
   the apparatus includes an auxiliary line that has a first end electrically connected to the positive electrode terminal or the negative electrode terminal and a second end connected to the high-electric potential side electrical path or the body ground, and that is arranged along the positive electrode side line or the body ground.

2. The in-vehicle apparatus according to claim 1, wherein the auxiliary line is arranged so as to be along the positive electrode side line.

3. The in-vehicle apparatus according to claim 2, wherein the auxiliary line is configured so as to cover the positive electrode side line and so as to be along the positive electrode side line.

4. The in-vehicle apparatus according to claim 3, further comprising:
   a case that houses the drive circuit, and
   a high-electric potential side terminal that is electrically connected to the high-electric potential side electrical path and projects from the case, wherein
   the auxiliary line is integrated with the positive electrode side line as a shielding line covering the positive electrode side line, and
   the positive electrode side line electrically connects the positive electrode terminal of the power supply and the high-electric potential side terminal.

5. The in-vehicle apparatus according to claim 4, further comprising a series connection of a plurality of filter capacitors that electrically connect the high-electric potential side electrical path and the low-electric potential side electrical path, wherein
   the second end of the auxiliary line is electrically connected to a connection point between adjacent two of the plurality of filter capacitors, and
   the apparatus comprises a DC component suppressing element that is provided to an electrical path extending from the first end of the auxiliary line to the connection point of the filter capacitors via the second end to suppress DC current flowing through the electrical path.

6. The in-vehicle apparatus according to claim 4, wherein the auxiliary line has:
   a first shielding line that has a first end electrically connected to the negative electrode and an opened second end, and that is arranged so as to cover the positive electrode side line;
   a second shielding line that has a first end electrically connected to the body ground and an opened second end, and that is arranged so as to cover the positive electrode side line; and
   a dielectric that is interposed between the first shielding line and the second shielding line in the area where the first shielding line and the second shielding line overlap with each other.

7. The in-vehicle apparatus according to claim 4, wherein the auxiliary line has:
   a plurality of first conductors that each has a first end connected to the negative electrode and an opened second end, and that each is arranged so as to be along a direction in which the positive electrode side line extends and to surround the positive electrode side line; and
   a plurality of second conductors that has a first end electrically connected to the body ground and an opened second end, and that is arranged so as to be along a direction in which the positive electrode side line extends and to surround the positive electrode side line, and
   the first conductors and the second conductors are alternately arranged in a circumferential direction of the positive electrode side line, and
   the auxiliary line has insulation parts that are interposed between the positive electrode side line, the first conductors, and the second conductors, and electrically insulate the positive electrode side line, the first conductors, and the second conductors from each other.

8. The in-vehicle apparatus according to claim 2, wherein the auxiliary line is arranged so as to be along the positive electrode side line in a state where the auxiliary line is wound around the positive electrode side line.

9. The in-vehicle apparatus according to claim 8, wherein the auxiliary line is integrated with the positive electrode side line in a state where the auxiliary line is wound around the positive electrode side line.

10. The in-vehicle apparatus according to claim 2, wherein
    an area of a loop path including the positive electrode side line and the auxiliary line is smaller than an area of a loop path including the positive electrode side line and the body ground.

11. The in-vehicle apparatus according to claim 1 further comprising a DC component suppressing element that is provided to the auxiliary line and suppresses DC current flowing to the auxiliary line.

12. The in-vehicle apparatus according to claim 11, wherein
    the apparatus includes the plurality of drive circuits,
    the positive electrode side line electrically connects the positive electrode terminal of the power supply and the high-electric potential side electrical paths of the plurality of drive circuits,
    the auxiliary line has:
    a common line electrically connected to the positive electrode terminal or the negative electrode terminal; and
    branch lines that branch off from the common line and are electrically connected to the high-electric potential side electrical paths of the drive circuits or the body ground, and
    the DC component suppressing element is disposed on the auxiliary line so that a distance between the power supply and the DC component suppressing element is shorter than a distance between the power supply and a branch point from which the branch lines branch off from the common line.

13. The in-vehicle apparatus according to claim 11, wherein
the DC component suppressing element is a capacitor.

14. The in-vehicle apparatus according to claim 1, wherein
the auxiliary line is arranged so as to be along the body ground.

15. The in-vehicle apparatus according to claim 14, wherein
an area of a loop path including the body ground and the auxiliary line is smaller than an area of a loop including the positive electrode side line and the body ground.

16. The in-vehicle apparatus according to claim 1, further comprising a case that houses the drive circuit, wherein
the power supply is a battery disposed so as to be apart from the case,
the positive electrode side line is arranged between the battery and the case, and
the auxiliary line is arranged outside the case and so as to be along the positive electrode side line or the body ground.

17. The in-vehicle apparatus according to claim 1, wherein
the drive circuit has a switch and is a power converter in which the switch is subjected to switching operation.

* * * * *